(12) United States Patent
Harish

(10) Patent No.: US 7,673,530 B2
(45) Date of Patent: Mar. 9, 2010

(54) CAPACITIVE SENSOR BASED STRUCTURE AND METHOD WITH TILT COMPENSATION CAPABILITY

(75) Inventor: Divyasimha Harish, Union City, CA (US)

(73) Assignee: Loadstar Sensors, Inc., Fremont, CA (US)

( * ) Notice: Subject to any disclaimer, the term of this patent is extended or adjusted under 35 U.S.C. 154(b) by 51 days.

(21) Appl. No.: 12/052,103

(22) Filed: Mar. 20, 2008

(65) Prior Publication Data

US 2008/0229847 A1    Sep. 25, 2008

Related U.S. Application Data

(60) Provisional application No. 60/919,257, filed on Mar. 20, 2007, provisional application No. 60/919,258, filed on Mar. 20, 2007.

(51) Int. Cl.
  *G01L 1/12* (2006.01)
  *G01B 7/16* (2006.01)
(52) U.S. Cl. ............... 73/862.626; 73/780; 73/862.625
(58) Field of Classification Search . 73/862.61–862.69, 73/780
  See application file for complete search history.

(56) References Cited

U.S. PATENT DOCUMENTS

| | | | | | |
|---|---|---|---|---|---|
| 4,458,770 | A | * | 7/1984 | Bucci | 177/210 C |
| 4,912,851 | A | * | 4/1990 | Rando et al. | 33/227 |
| 5,563,466 | A | * | 10/1996 | Rennex et al. | 310/309 |
| 5,642,056 | A | * | 6/1997 | Nakajima et al. | 324/758 |
| 6,310,990 | B1 | * | 10/2001 | Putnam et al. | 385/12 |
| 6,564,642 | B1 | * | 5/2003 | Clifford | 73/718 |
| 7,287,415 | B2 | * | 10/2007 | Borwick et al. | 73/54.01 |
| 2006/0066319 | A1 | * | 3/2006 | Dallenbach et al. | 324/662 |
| 2008/0190210 | A1 | * | 8/2008 | Harish et al. | 73/780 |
| 2009/0160462 | A1 | * | 6/2009 | Harish | 324/686 |

\* cited by examiner

*Primary Examiner*—Max Noori
(74) *Attorney, Agent, or Firm*—Raj Abhyanker LLP

(57) ABSTRACT

A method and system of a capacitive sensor based structure and method with tilt compensation capability is disclosed. In one embodiment, a sensor includes, a series of nested cantilever beams (e.g., may face each other in alternating form such that each subsequent cantilever beam is inside and oppositely facing a respective outer cantilever beam) in an upper surface of a tilt correction assembly, a spacer coupled to a contact zone of a lower surface of the tilt correction assembly, and a first conductive surface and a second conductive surface substantially parallel to the first conductive surface, wherein the spacer to cause at least one of the first conductive surface and the second conductive surface to deflect when a force is applied to a force measuring assembly above the sensor.

19 Claims, 27 Drawing Sheets

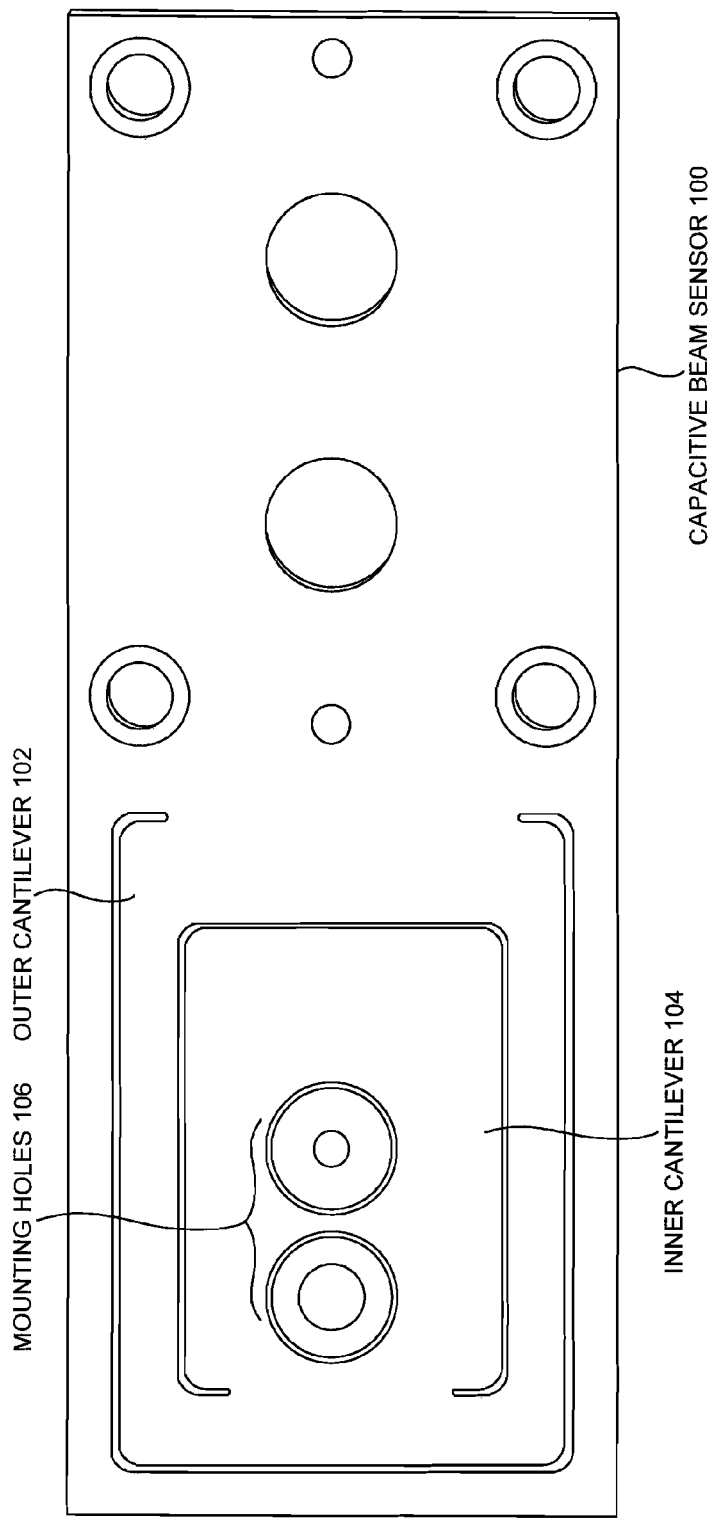
FIGURE 1A (TOP VIEW)

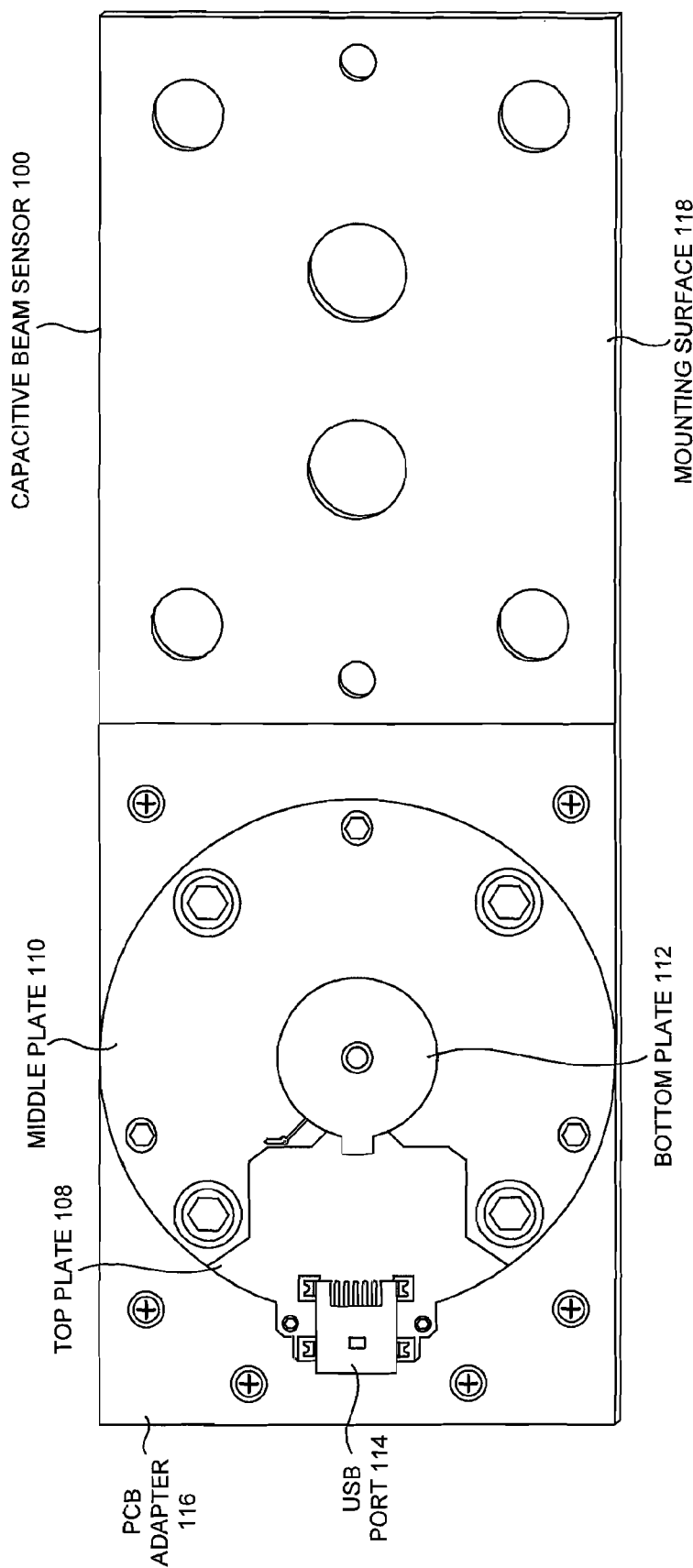
FIGURE 1B (BOTTOM VIEW)

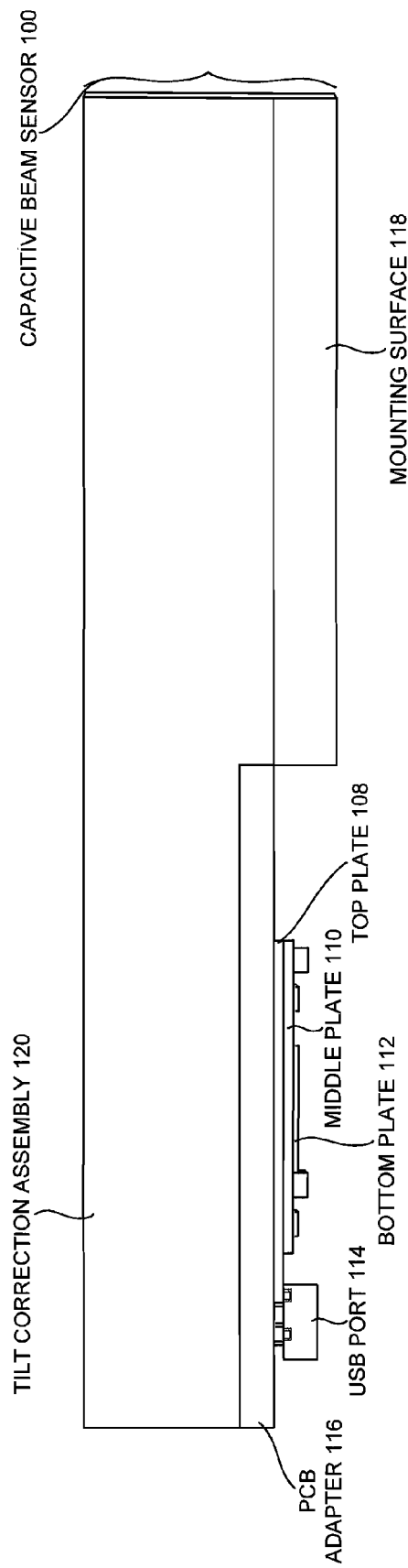
FIGURE 1C (SIDE VIEW)

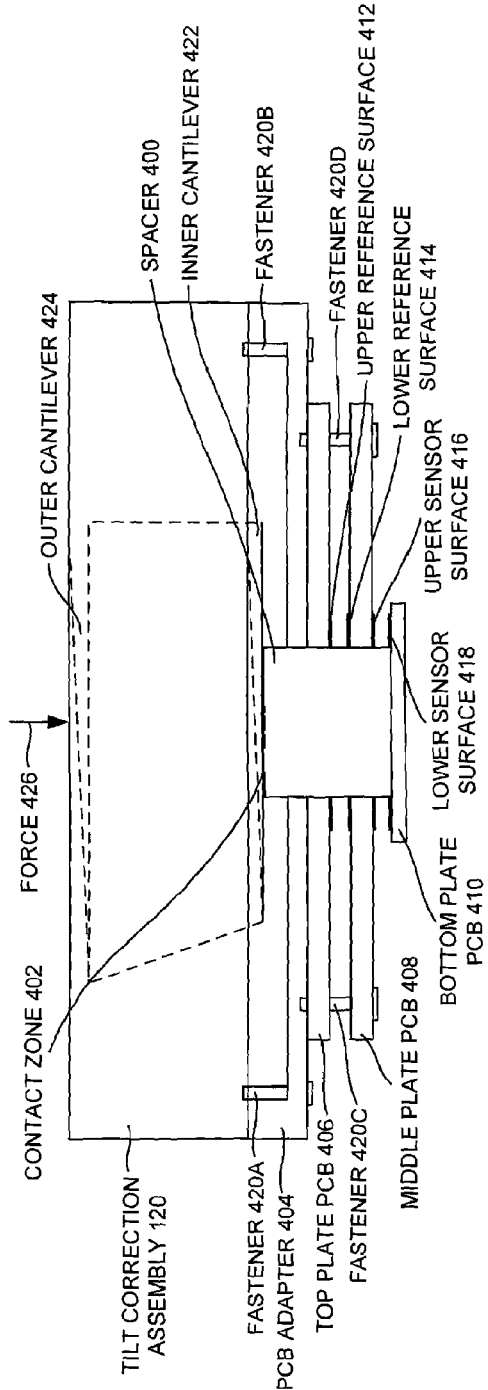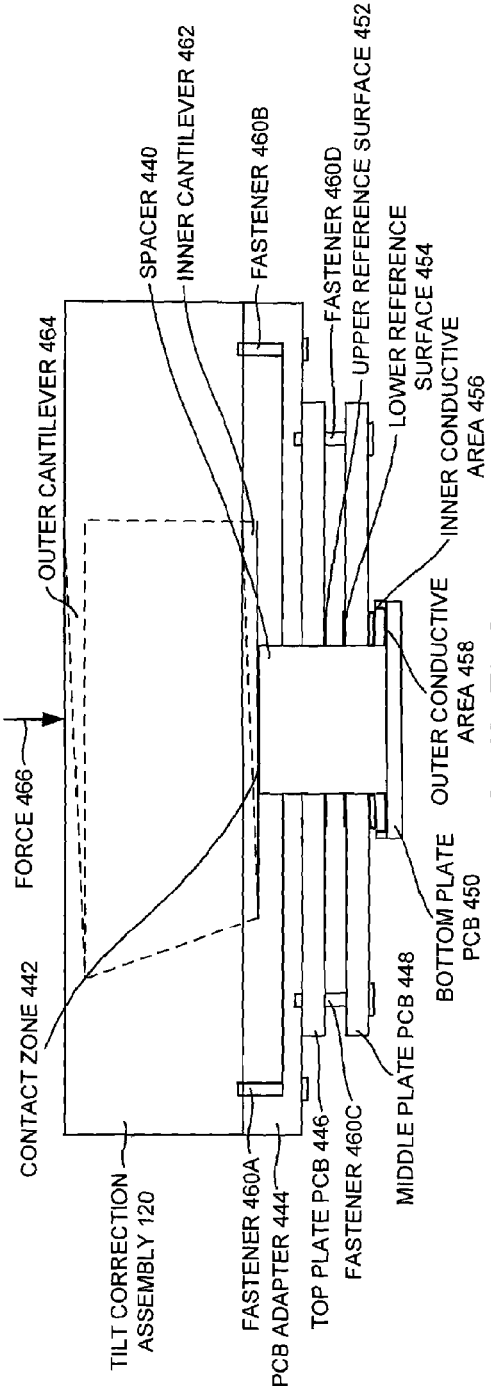

FIGURE 7 (BOTTOM VIEW)

FIGURE 8 (TOP VIEW)

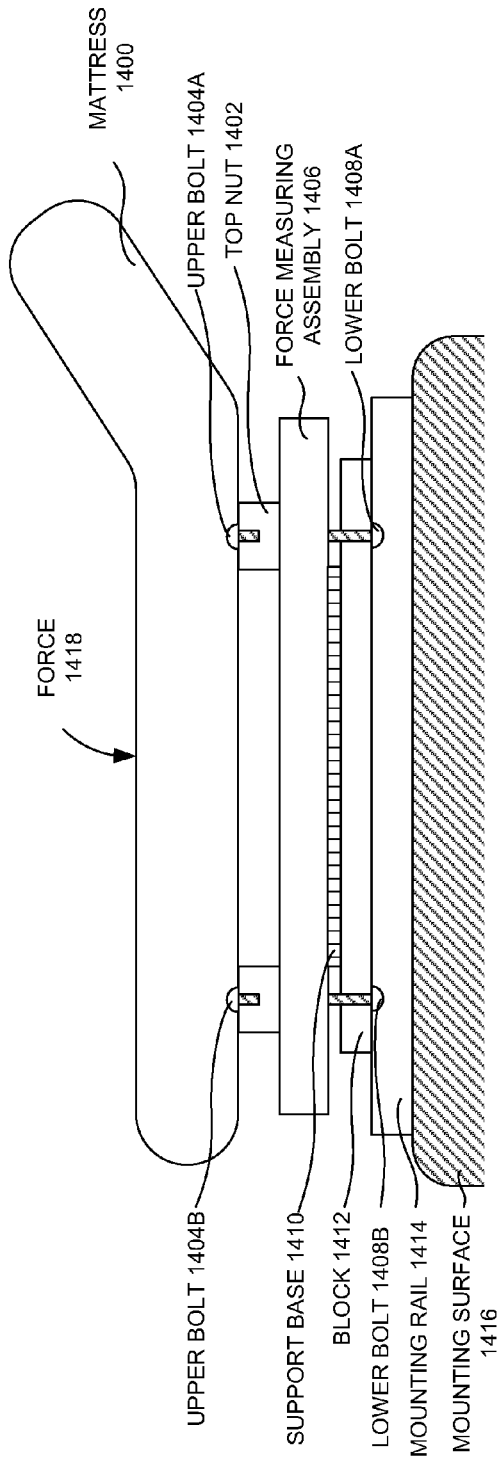
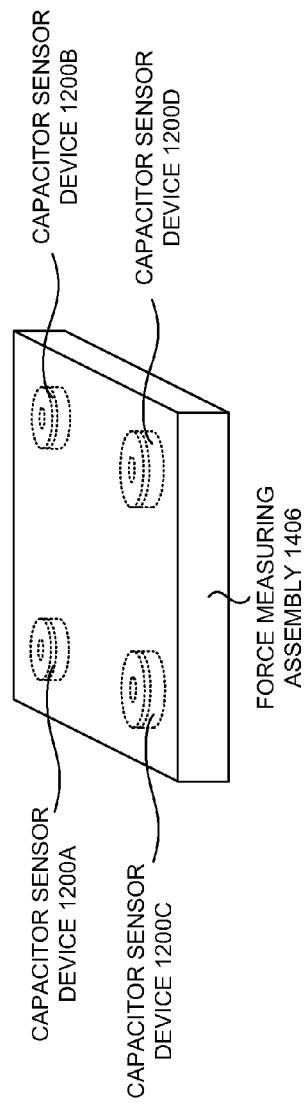
FIGURE 14A
FIGURE 14B

CAPACITIVE SENSOR BASED STRUCTURE AND METHOD WITH TILT COMPENSATION CAPABILITY

CLAIMS OF PRIORITY

This patent application claims priority from:
(1) U.S. Provisional patent application No. 60/919,257, titled CAPACITIVE SENSOR BASED SUPPORT STRUCTURE filed on Mar. 20, 2007; and
(2) U.S. Provisional patent application No. 60/919,258, titled CAPACITIVE BEAM SENSOR WITH TILT COMPENSATION CAPABILITY filed on Mar. 20, 2007.

FIELD OF TECHNOLOGY

This disclosure relates generally to technical fields of measuring devices and, in several embodiments a capacitive sensor based structure and method with tilt compensation capability.

BACKGROUND

A sensor may be used to gauge a force (e.g., a load, weight, etc.) applied by one or more physical bodies on another physical body. The sensor may be used in various applications (e.g., a microwave oven, a scale, etc.). The sensor may not be very convenient to use, economical, and/or robust in design.

For example, a hospital staff member (e.g., a nurse, a physician, etc.) may need to monitor how well a patient slept on a bed during a night and/or see how many times the patient woke up and/or moved during the night. In some instances, the patient may wander around in a hospital in need of assistance, but the hospital staff member may not be aware that there exists a problem. This may cause a delay in delivering medical services to the patient. In other instances, an automobile (e.g., a car, a truck, a motorcycle, etc.) may waste valuable resources (e.g., time and gas for drivers) waiting at an intersection for a light to turn green when there are no cars crossing the intersection. Precise measurements of ingredients (e.g., sugar, salt, chicken stock, flour etc.) may be time-consuming and burdensome because the ingredients may need to be transported to a measuring device (e.g., a commercial kitchen needing transportation of ingredients between an oven and a scale). Similarly, regulating light in a dark area may be expensive and wasteful (e.g., light may be wasted even when people are not in a room).

A capacitive force-measuring device may be used to measure a force (e.g., a load) applied on it, and/or may generate a measurement associated with the force in some of the examples described above. However, the measurement may be distorted (e.g., because of an unequal application of the force). For example, the load being exerted over the capacitive force-measuring device may be tilted resulting in an error in the measurement. When the capacitive force-measuring device is not stably mounted on a level ground the error may be even greater. The load being exerted over the capacitive force-measuring device on a beam may also cause a tilt (e.g., may cause a divergence of capacitor plates from being parallel, resulting in measurement errors).

SUMMARY

A method and system of a capacitive sensor based structure and method with tilt compensation capability is disclosed. In one aspect, a sensor includes, a series of nested cantilever beams (e.g., may face each other in alternating form such that each subsequent cantilever beam is inside and oppositely facing a respective outer cantilever beam) in an upper surface of a tilt correction assembly, a spacer coupled to a contact zone of a lower surface of the tilt correction assembly, and a first conductive surface and a second conductive surface substantially parallel to the first conductive surface, wherein the spacer to cause at least one of the first conductive surface and the second conductive surface to deflect when a force is applied to a force measuring assembly above the sensor.

The force measuring assembly may distribute the force across sensors below the force measuring assembly. The sensors may have the series of nested cantilever beams. The force may cause the series of nested cantilever beams to deflect inward. The upper surface of the tilt correction assembly may include threaded mounting holes at a center of an innermost inner cantilever beam of the series of nested cantilever beams (e.g., such that the threaded mounting holes permit the sensor to be mounted to a mountable object through a mounting structure).

The mounting structure and the sensor may be encompassed by a device casing. The sensor may include an inner conductive area overlapping with an outer conductive area of the sensor to change an overlap area when the force is applied to the force measuring assembly (e.g., thereby causing a change in capacitance between the inner conductive area and the outer conductive area).

The sensor may include a printed circuit board having a heightened surface along its borders creating a space that enables the series of nested cantilever beams to displace when the force is applied to the force measuring assembly. The force measuring assembly may form a platform that is affixed to a mattress of a resting platform. The force measuring assembly may form a base of a heating oven that may determine a quantity of heat required based on a weight of an object placed on the force measuring assembly. The force measuring assembly may form a platform of a floor that may determine whether lighting is required based on a weight of an object placed on the platform. The force measuring assembly may be part of a patient monitoring system that may transmit an alert to a hospital staff member across wireless and/or wired devices (e.g., when there may be a change in the force reading beyond a threshold value).

The force measuring assembly may be part of a traffic control system that may measure a presence of an automobile at a particular location. The force measuring assembly may transmit a wireless alert to a maintenance center based on abnormal force readings witnessed through the force measuring assembly. The sensor may also include a processing and/or communication zone of the first conductive surface and the second conductive surface having circuitry that may enable communication with an external system (e.g., may be through a Universal Serial Bus (USB) interface).

The circuitry may be a wireless enabled circuitry that enables the sensor to operate through a wireless network including a Bluetooth network, a WiFi network, and/or a ZigBee network, etc. A method includes creating a series of nested cantilever beams in an upper surface of a tilt correction assembly, coupling a spacer to a contact zone of a lower surface of the tilt correction assembly, and causing at least one of a first conductive surface and a second conductive surface to deflect through the spacer when a force is applied to a force measuring assembly above the sensor that causes the series of nested cantilever beams to deflect inward, wherein the first conductive surface and the second conductive surface are substantially parallel to each other. The method may include distributing the force across sensors below the force measuring assembly. The sensors may have the series of nested cantilever beams.

The series of nested cantilever beams may face each other in alternating form such that each subsequent cantilever beam is inside and oppositely facing a respective outer cantilever beam. A force measuring assembly includes a capacitive sensor below the force measuring assembly to change a capacitance reading when a force is applied to the force measuring assembly, and a tilt correction assembly of the capacitive sensor to channel a deflection of an upper surface of the sensor such that it does not cause a tilt between conductive plates forming the capacitive sensor. The force measuring assembly may include a circuitry associated with the force measuring assembly that may enable a measurement of the capacitive sensor to be communicated through a wireless and/or a wired network.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 1A is a top view of a capacitive beam sensor 100, depicting an outer cantilever, an inner cantilever and one or more mounting holes, according to one embodiment.

FIG. 1B and FIG. 1C illustrates a bottom and a side view of the capacitive beam sensor 100, according to one embodiment.

FIG. 4A and FIG. 4B are cross-sectional views of the capacitive beam sensor 100 when a load is applied, illustrating two different ways a sensor capacitor may be formed, according to one embodiment.

FIG. 14A illustrates a mattress which may use upper bolts affixing it to a force measuring assembly and lower bolts affixing the force measuring assembly to a mounting rail through a block, according to one embodiment.

FIG. 14B is a force measuring assembly having multiple sensor capacitors and reference capacitors, according to one embodiment.

Figure 2:
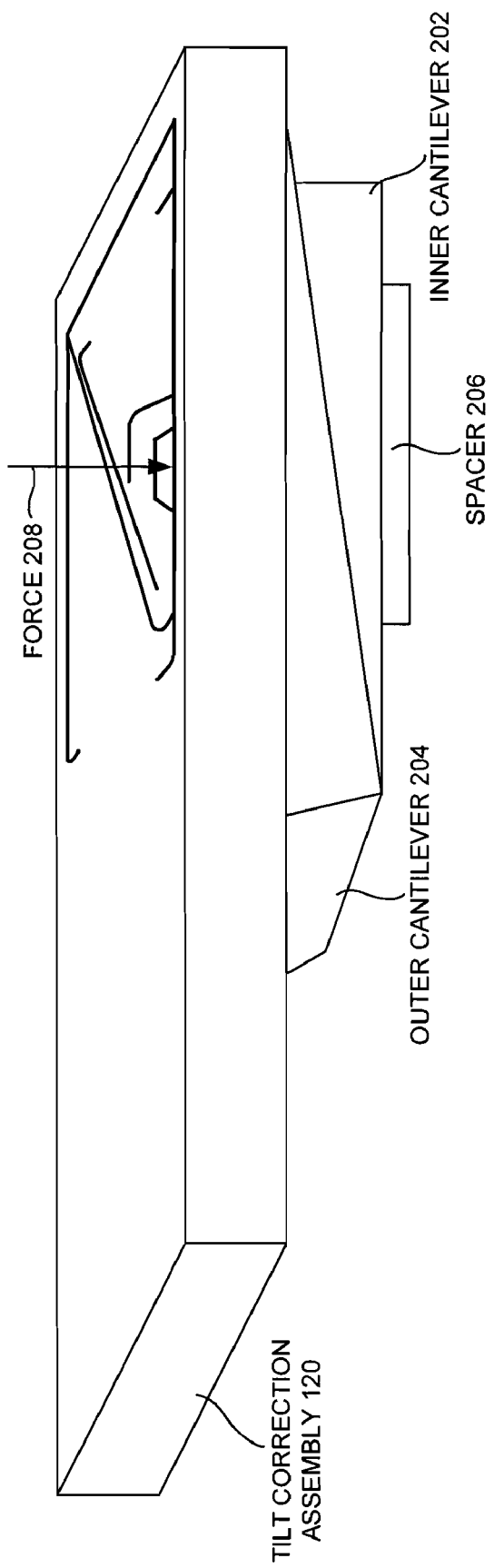
FIG. 2 illustrates the operation of the tilt correction assembly, which may include an inner cantilever, an outer cantilever, and a spacer of a capacitor beam sensor 100, according to one embodiment.

Other features of the present embodiments will be apparent from the accompanying drawings and from the detailed description that follows.

DETAILED DESCRIPTION

A method and system of a capacitive sensor based structure and method with tilt compensation capability is disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a sensor (e.g., may include the capacitive beam sensor 100 of FIG. 1) includes, a series of nested cantilever beams (e.g., may face each other in alternating form such that each subsequent cantilever beam is inside and oppositely facing a respective outer cantilever beam) in an upper surface of a tilt correction assembly (e.g., the tilt correction assembly 120 of FIG. 1), a spacer (e.g., the spacer 206 of FIG. 2) coupled to a contact zone of a lower surface of the tilt correction assembly 120, and a first conductive surface and a second conductive surface substantially parallel to the first conductive surface, wherein the spacer to cause at least one of the first conductive surface and the second conductive surface to deflect when a force is applied to a force measuring assembly above the sensor.

A method includes creating a series of nested cantilever beams in an upper surface of a tilt correction assembly (e.g., the tilt correction assembly 120 of FIG. 1), coupling a spacer to a contact zone of a lower surface of the tilt correction assembly 120, and causing at least one of a first conductive surface and a second conductive surface to deflect through the spacer when a force (e.g., the force 208 of FIG. 2) is applied to a force measuring assembly above the sensor that causes the series of nested cantilever beams to deflect inward, wherein the first conductive surface and the second conductive surface are substantially parallel to each other.

A force measuring assembly includes a capacitive sensor below the force measuring assembly to change a capacitance reading when a force is applied to the force measuring assembly, and a tilt correction assembly of the capacitive sensor to channel a deflection of an upper surface of the sensor such that it does not cause a tilt between conductive plates forming the capacitive sensor.

FIG. 1A is a top view of a capacitive beam sensor 100, depicting an outer cantilever 102, an inner cantilever 104 and one or more (e.g., two, three, etc.) mounting holes 106, according to one embodiment. A cantilever (e.g., a beam) may be anchored at one end and projecting into space. The outer cantilever 102 and the inner cantilever 104 may operate to reduce capacitive measurement error due to tilt from an applied force (e.g., applied load) and together form a tilt correction assembly 120, as shown in FIG. 1C. The operation of the tilt correction assembly 120 may be best understood with reference to FIG. 2.

The mounting holes 106 may vary in radius, depth, and structure (e.g., threaded). They may also vary in displacement from their beam support (e.g., closer to the edge).

FIG. 1B and FIG. 1C illustrates a bottom and a side view of the capacitive beam sensor 100, comprising of a top plate 108, a middle plate 110, a bottom plate 112, a universal serial bus (USB) port 114, a PCB adapter 116, a mounting surface 118, and a tilt correction assembly 120.

The top plate 108, the middle plate 110, and the bottom plate 112 may include various components consisting of the reference and/or sensor capacitors of the capacitive beam sensor 100. These components may be best understood with reference to FIGS. 3-7. The USB port 114 may be used to communicate a data (e.g., the change in capacitance via an analog voltage or frequency signal and/or a digital data such as USB or RS232 signal) to an external device (e.g., a data processing system such as a computer, a PDA, etc. and/or a data storage device such as a USB drive, CompactFlash (CF) card etc.). The printed circuit board (PCB) adapter 116 may provide a gap for the tilt correction assembly 120 to operate without moving the top plate 108 and the middle plate 110. The lower mounting surface 120 (e.g., another threaded stud) may be used to fasten the capacitive beam sensor to another mounting structure (e.g., the load plate 1002 in FIG. 10).

The tilt correction assembly 120 may use one or more (e.g., two, three, etc.) cantilevers (e.g., the outer cantilever 102 and the inner cantilever 104) to correct any tilt caused by a displacement from an applied load (e.g., a force 208 of FIG. 2). A series of nested cantilever beams may be formed in an upper surface of a tilt correction assembly (e.g., the tilt correction assembly 120 of FIG. 1). The circuitry to enable communication with an external system may be through a Universal Serial Bus (USB) interface (e.g., using the USB port 114 of FIG. 1B). This process may be best understood with reference to FIG. 2.

FIG. 2 illustrates the operation of the tilt correction assembly 120, which may include an inner cantilever 202, an outer cantilever 204, and a spacer 206 of a capacitor beam sensor 100, according to one embodiment. The outer cantilever 204 may include the inner cantilever 202 such that when a force 208 (e.g., a weight) is applied, both cantilevers may experience this applied load. Since the two cantilevers (e.g., the inner cantilever 202 and the outer cantilever 204) are supported on opposite ends, the resulting tilts from the applied force (e.g., the weight from the force 208) will compensate each other. This tilt compensation may result in a deflection of the spacer 206, parallel to the other PCB plates (e.g., a bottom plate PCB 310 of FIG. 3). The spacer may be connected to bottom plate 112 which may contain capacitive components (e.g., lower sensor surface 314 in FIG. 3).

In one example embodiment, the force 208 (e.g., the weight) may cause the displacement in the spacer 206. The tilt correction assembly 120 may cause the displacement to be non-parallel to the other plates (e.g., the bottom plate PCB 310 of FIG. 3), thus causing error in the displacement measurement. the spacer may be coupled to a contact zone of a lower surface of the tilt correction assembly 120

In another example embodiment, the tilt correction assembly 120 may be in a circular shape (e.g., a circular outer cantilever and a circular inner cantilever supported at opposite ends).

Figure 3:
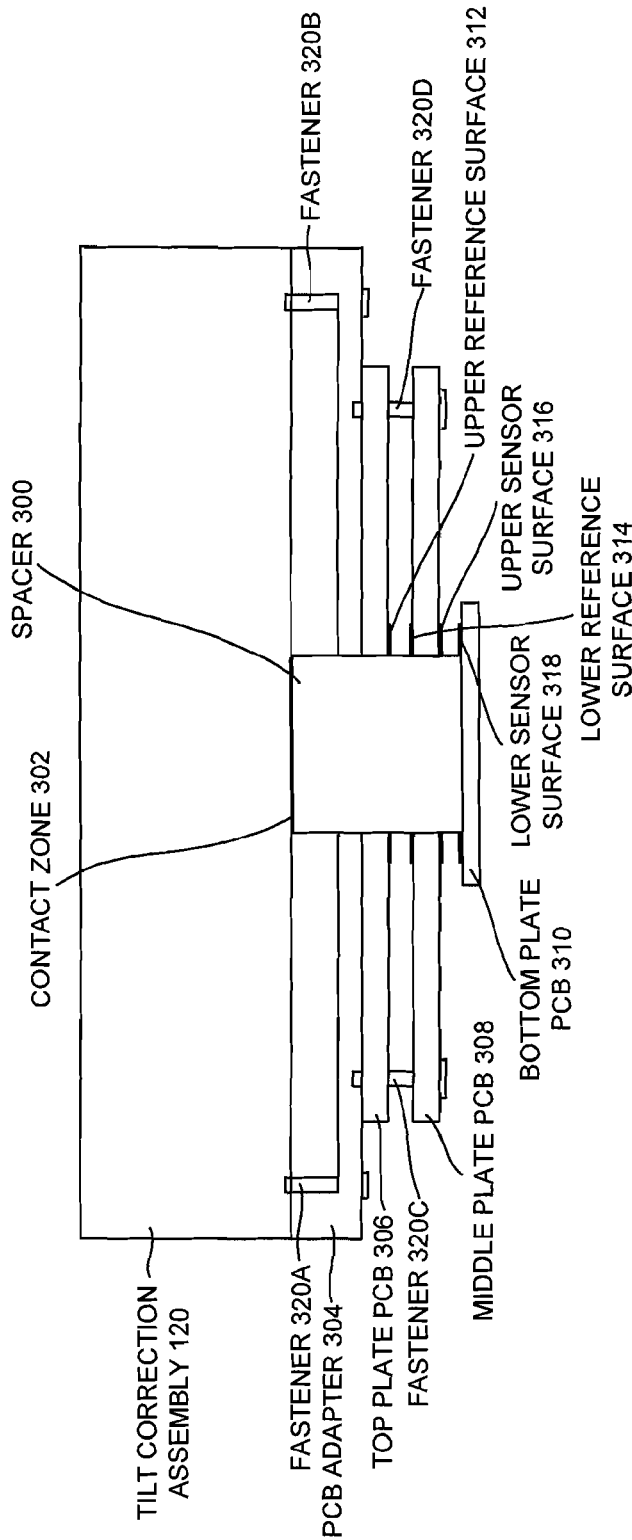
FIG. 3 is a cross sectional view of capacitive beam sensor 100, displaying formation of a sensor capacitor and a reference capacitor, according to one embodiment.

FIG. 3 is a cross sectional view of capacitive beam sensor 100, displaying the formation of the sensor capacitor and a reference capacitor, according to one embodiment. In FIG. 3, the capacitive beam sensor 100 includes a tilt correction assembly 120, a spacer 300, a contact zone 302, a PCB adapter 304, top plate PCB 306, middle plate PCB 308, bottom plate PCB 310, an upper reference surface 312, a lower reference surface 314, an upper sensor surface 316, a lower sensor surface 318, and fasteners 320A-D, according to one embodiment. A reference capacitor may be formed between the upper reference surface 312 and the lower reference surface 314. A sensor capacitor may be formed between the upper sensor surface 316 and the lower sensor surface 318.

The PCB adapter 304 may be enjoined to the tilt correction assembly 120 outside of the outer cantilever 102 in FIG. 1A using one or more (e.g., two, three, four etc.) fasteners (e.g., fastener 320A and fastener 320B). A series of nested cantilever beams may be created in an upper surface of a tilt correction assembly 120. A spacer may be coupled to a contact zone of a lower surface of the tilt correction assembly 120. A first conductive surface and a second conductive surface may be caused to deflect through the spacer when a force is applied to a force measuring assembly 120 above the sensor that causes the series of nested cantilever beams to deflect inward. The first conductive surface and the second conductive surface may be substantially parallel to each other. The top plate PCB 306 and the middle plate PCB 308 may be enjoined to the PCB adapter 304 using multiple (e.g. two, three, four etc.) fasteners (e.g., fastener 320C and fastener 320D).

FIG. 4A and FIG. 4B are cross-sectional views of the capacitive beam sensor 100 when a load is applied (e.g., a force 426 of FIG. 4A), illustrating two different ways a sensor capacitor may be formed.

In FIG. 4A, the capacitive beam sensor 100 includes the tilt correction assembly 120, a spacer 400, a contact zone 402, a PCB adapter 404, top plate PCB 406, middle plate PCB 408, bottom plate PCB 410, an upper reference surface 412, a lower reference surface 414, an upper sensor surface 416, a lower sensor surface 418, multiple fasteners 420, according to one embodiment. The tilt correction assembly 120 includes an inner cantilever 422 and an outer cantilever 424 that may be displaced when a force 426 (e.g., a weight) is applied.

The deflection of the inner cantilever 422 and the outer cantilever 424 (e.g., due to the force 426) may cause the displacement in the spacer 400 at the contact zone 402. The spacer 400 may create a displacement in the bottom plate PCB 410 in the downward direction, away from the middle plate PCB 408. The change in distance may bring about a change in capacitance of the sensor capacitor.

In one example embodiment, the upper sensor surface 416 and the lower sensor surface 418 are substantially parallel to each other and may have the same physical area/and or thickness. The change in capacitance may be inversely proportional to the change in the distance between the sensor surfaces.

In FIG. 4B, the capacitive beam sensor 100 includes the tilt correction assembly 120, a spacer 440, a contact zone 442, a PCB adapter 444, top plate PCB 446, middle plate PCB 448, bottom plate PCB 450, an upper reference surface 452, a lower reference surface 454, an upper sensor surface 456, a lower sensor surface 458, multiple fasteners 460A-D, according to one embodiment. The tilt correction assembly 120 may include an inner cantilever 462 and an outer cantilever 464 that become displaced when a force 426 (e.g., the weight) is applied.

A deflection of the inner cantilever 422 and the outer cantilever 424 (e.g., due to the force 466) may cause the displacement in the spacer 440 at the contact zone 442. The spacer 440 may create the displacement in the bottom plate PCB 450 in the downward direction, away from the middle plate PCB 448. This may cause a change in an overlap area of the inner conductive area 456 and the outer conductive area 458 of the sensor capacitor. The change in the overlap area may bring about a change in capacitance of the sensor capacitor.

In one example embodiment, the inner conductive area 456 and the outer conductive area 458 may be substantially parallel to each other and may have the same physical area and/or thickness. The change in capacitance of the sensor capacitor may be proportional to the change in the overlap area.

Figure 5:
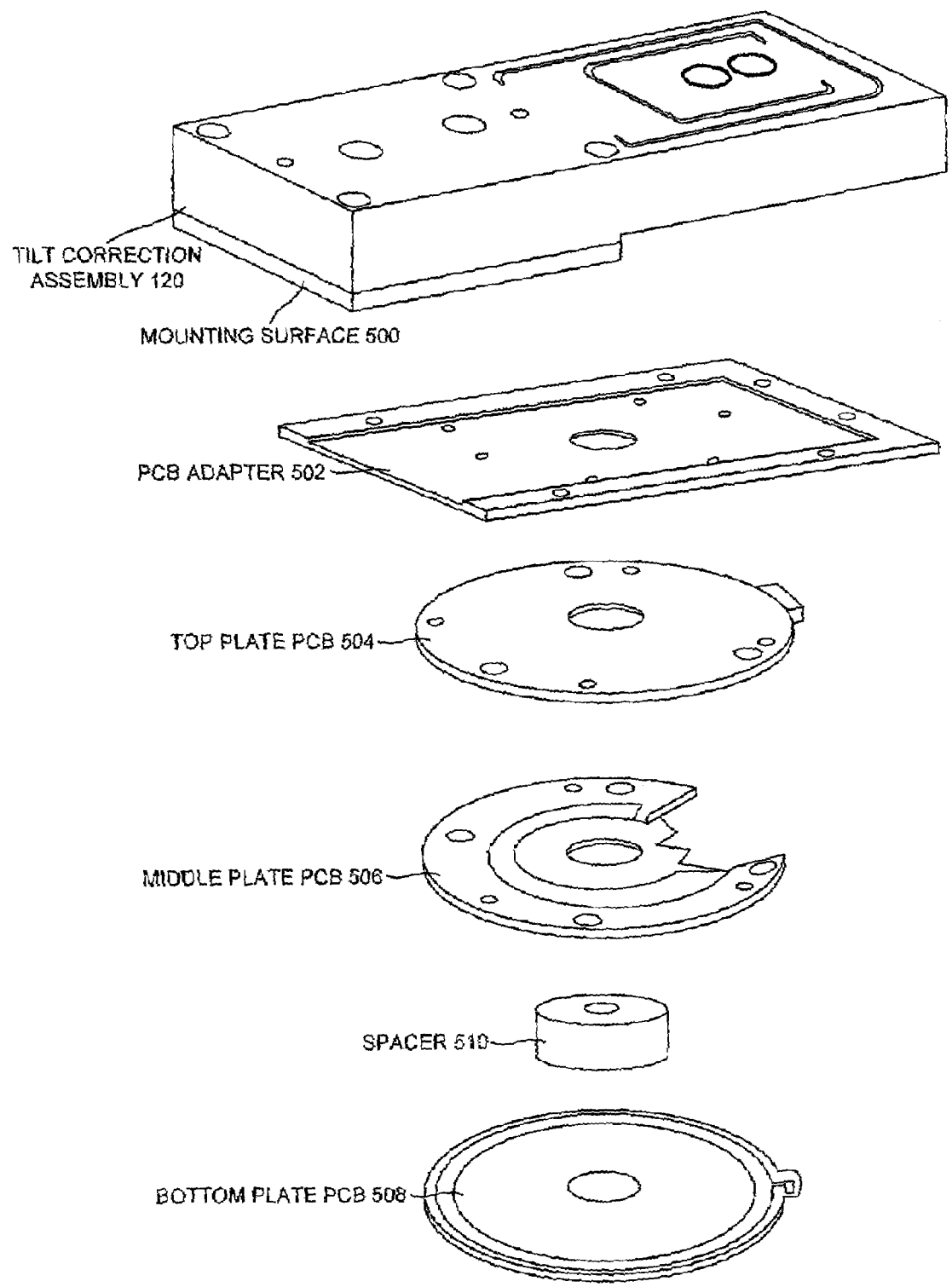
FIG. 5 is an exploded view of the capacitive beam sensor 100, according to one embodiment.

FIG. 5 is an exploded view of the capacitive beam sensor 100, including the tilt correction assembly 120, a mounting surface 500, a PCB adapter 502, a top plate PCB 504, a middle plate PCB 506, a bottom plate PC 508, and a spacer 510, according to one embodiment.

In one example embodiment, the PCB adapter 502 may have a heightened surface along its borders, creating a space between its surface and the bottom of the tilt correction assembly 120. This gap may provide adequate space for the tilt correction assembly 120 to displace once a load is applied (e.g., the force 426 of FIG. 4A).

Particularly, FIG. 5 illustrates a gap in the circular spacing in the middle of PCB adapter 502, the top plate PCB 504, and the middle plate PCB 506. This space may allow the spacer 510 to have direct contact with the bottom of the tilt correction assembly 120, creating the contact zone (e.g., the contact zone 402 in FIG. 4A). This may allow the spacer and the bottom plate to displace when the force (e.g., the weight) is applied without creating the displacement of the PCB adapter 502, the top plate PCB 504, or the middle plate PCB 506, which may be enjoined together with the tilt correction assembly 120 with multiple (e.g., two, three, or four, etc.) fasteners. The printed circuit board may have a heightened surface along its borders creating a space that enables the series of nested cantilever beams to displace when the force is applied to the force measuring assembly 1406 (e.g., as illustrated in FIG. 5).

Figure 6:
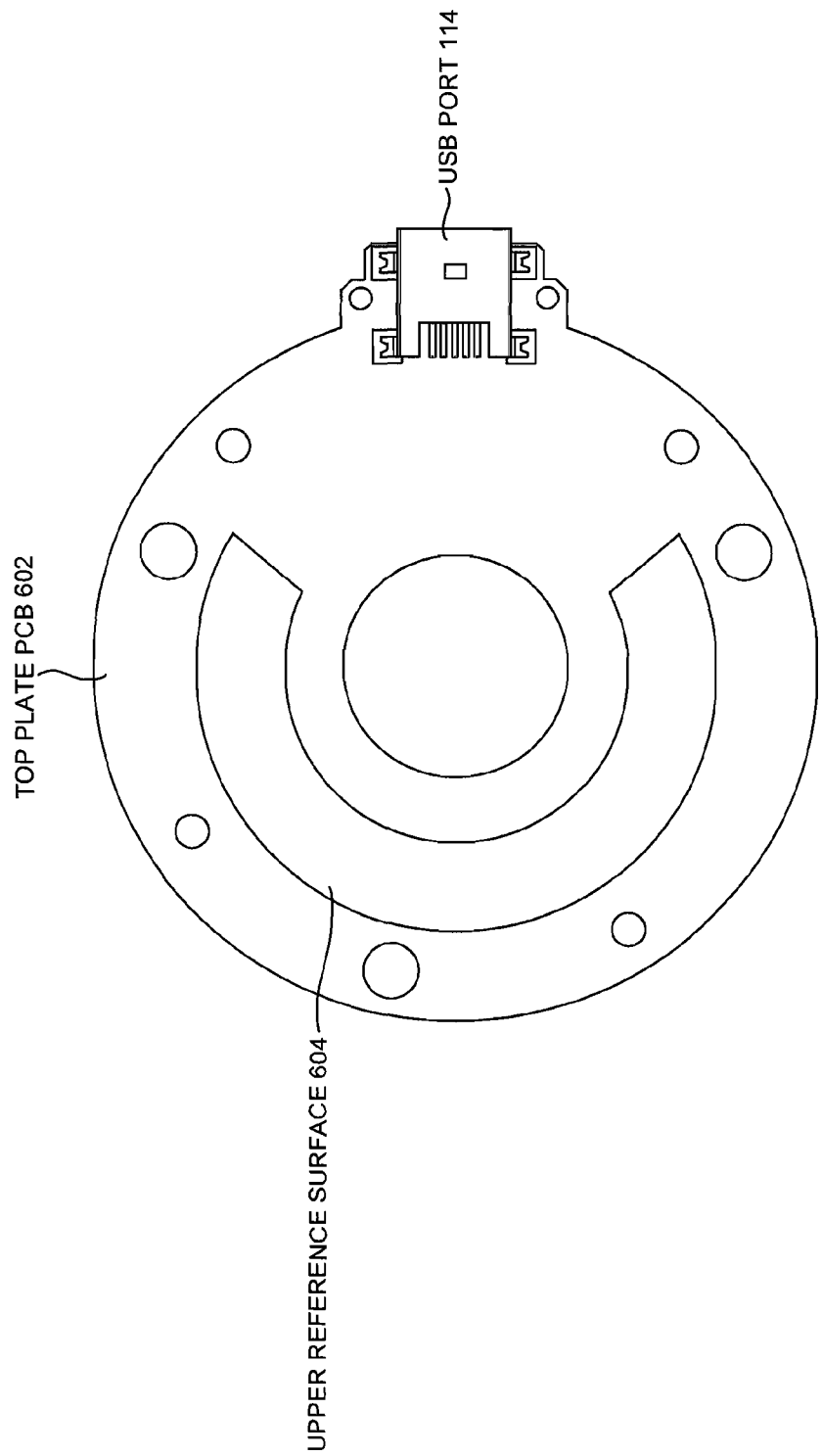
FIG. 6 is a bottom view of a top plate PCB, including an upper reference surface and a USB port, according to one embodiment.

FIG. 6 is a bottom view of the top plate PCB 602, including an upper reference surface 604 and the USB port 114, according to one embodiment. The upper reference surface 604 may be printed on the bottom surface of the top plate printed circuit board (PCB) 602. The upper reference surface 604 may be a driving plate of the reference capacitor (e.g., formed by the upper reference surface 604 and the lower reference surface 704 of FIG. 7).

Figure 7:
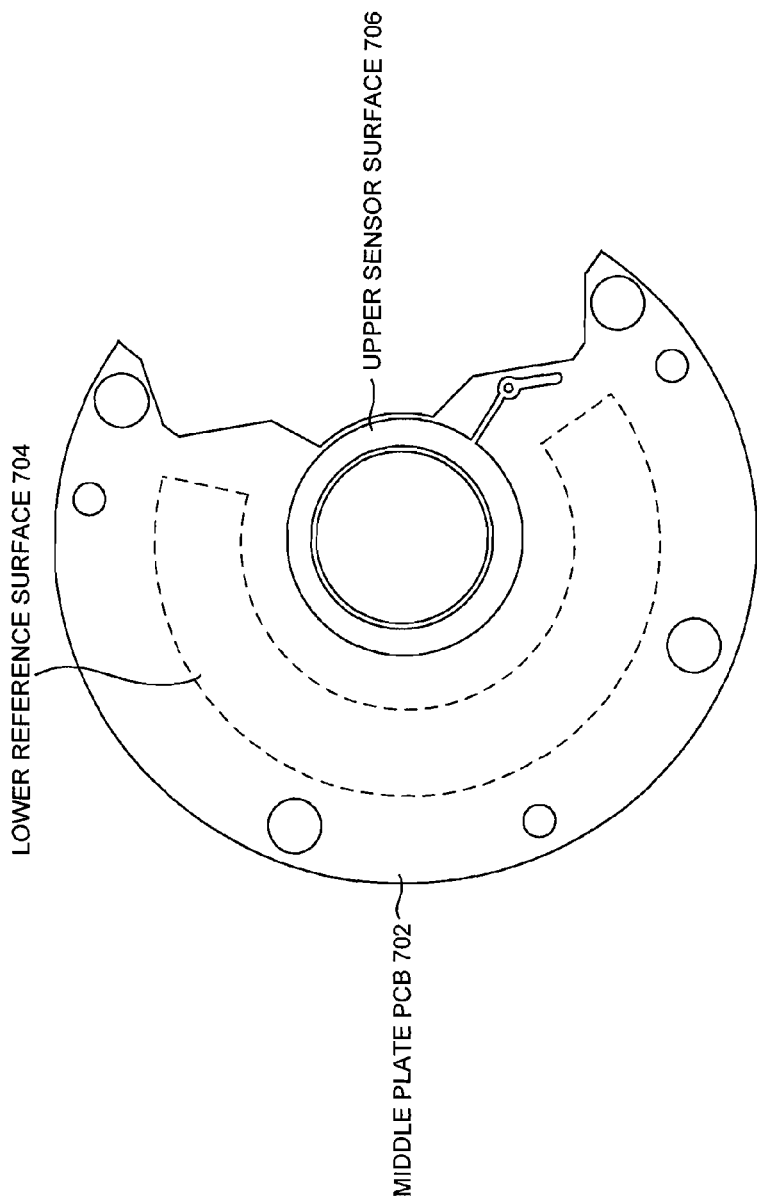
FIG. 7 is a bottom view of a middle plate PCB, including a lower reference surface and an upper sensor surface, according to one embodiment.

FIG. 7 is a bottom view of the middle plate PCB 702, including a lower reference surface 704 and an upper sensor surface 706, according to one embodiment. The lower reference surface 604 may be printed on the top surface of the middle plate PCB 702. The upper reference surface 704 may be the driving plate of the reference capacitor (e.g., formed by the upper reference surface 604 and the lower reference surface 704 of FIG. 7). The upper sensor surface 706 may be printed on the bottom surface of the middle plate PCB 702. The upper sensor surface 706 may be the driving plate of the sensor capacitor (e.g., formed by the upper sensor surface 706 and the lower sensor surface 804 of FIG. 8).

Figure 8:
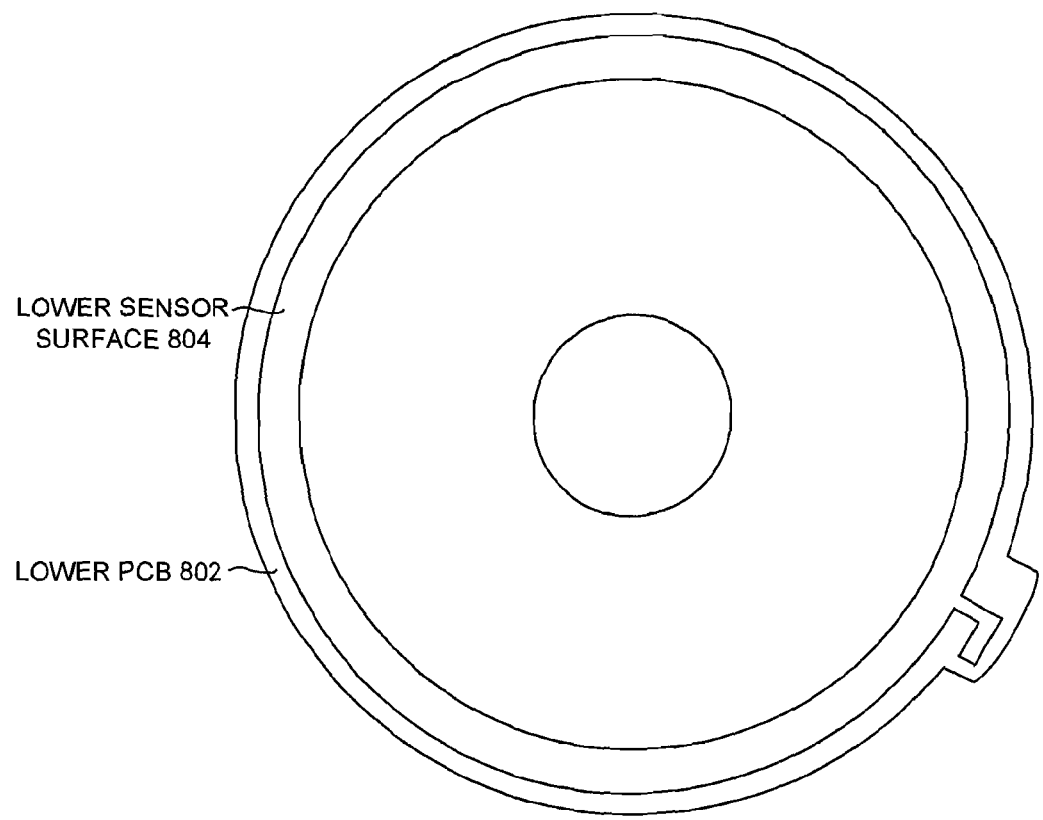
FIG. 8 is a top view of the bottom plate PCB, including a lower sensor surface, according to one embodiment.

FIG. 8 is a top view of the bottom plate, including a lower sensor surface 804, according to one embodiment. The lower sensor surface 804 may be printed on the top surface of the lower PCB 802. The lower sensor surface 804 may be the driving plate of the sensor capacitor (e.g., formed by the upper sensor surface 706 of FIG. 7 and the lower sensor surface 804.

Figure 9:
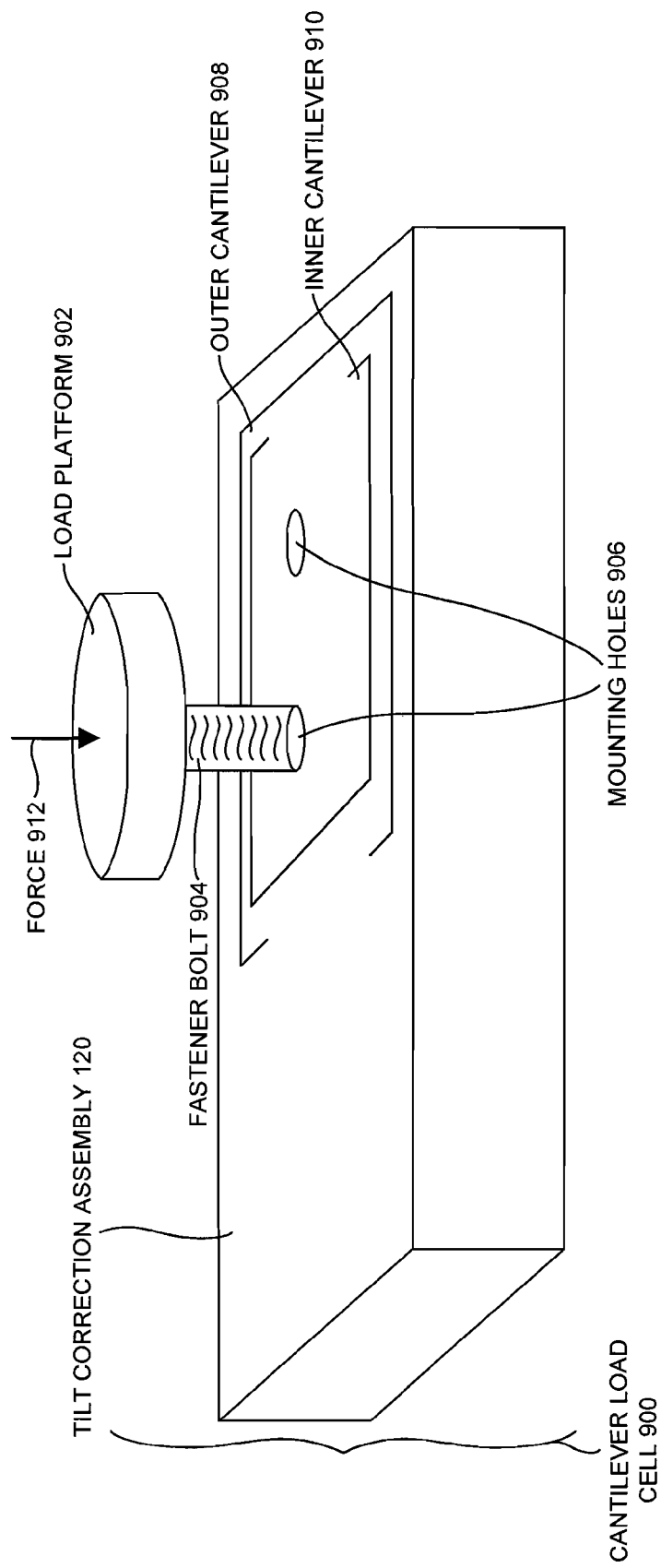
FIG. 9 is a three-dimensional view of a cantilever load cell, including a tilt correction assembly mounted with a load platform by a fastener bolt, according to one embodiment.

FIG. 9 is a three-dimensional view of a cantilever load cell 900, including a tilt correction assembly 120 mounted with a load platform 902 by a fastener bolt 904, according to one embodiment. FIG. 9 also illustrates the outer cantilever 906, inner cantilever 908, mounting holes 910, and a force 912 (e.g., a weight) applied to the load platform 904, according to one embodiment.

The load platform 902 may vary in size and shape (e.g., square, rectangular, circular, etc.) depending on its application. The fastener bolt 904 may also vary in size and shape, depending on the specifications of the mounting holes 910. When a force 912 is applied on the load platform 902, a displacement of the bottom plate PCB 802 of FIG. 8 may cause the displacement of the lower sensor surface 416 from the an upper sensor surface 418 of FIG. 4. This displacement may create the change in capacitance, which may be used to calculate a measurement (e.g., measurement 1128 in FIG. 11).

The upper surface (e.g., the upper sensor surface 316 of FIG. 3) of the tilt correction assembly 120 to include threaded mounting holes (e.g., the mounting holes 906 of FIG. 9) at a center of an innermost inner cantilever beam (e.g., the inner cantilever 910 of FIG. 9) of the series of nested cantilever beams, such that the threaded mounting holes 906 permit the sensor to be mounted to a mountable object through a mounting structure. The mounting structure and the sensor may be encompassed by a device casing. The nested cantilever beams may be circular in form. This process may be best understood with reference to FIG. 11.

Figure 10:
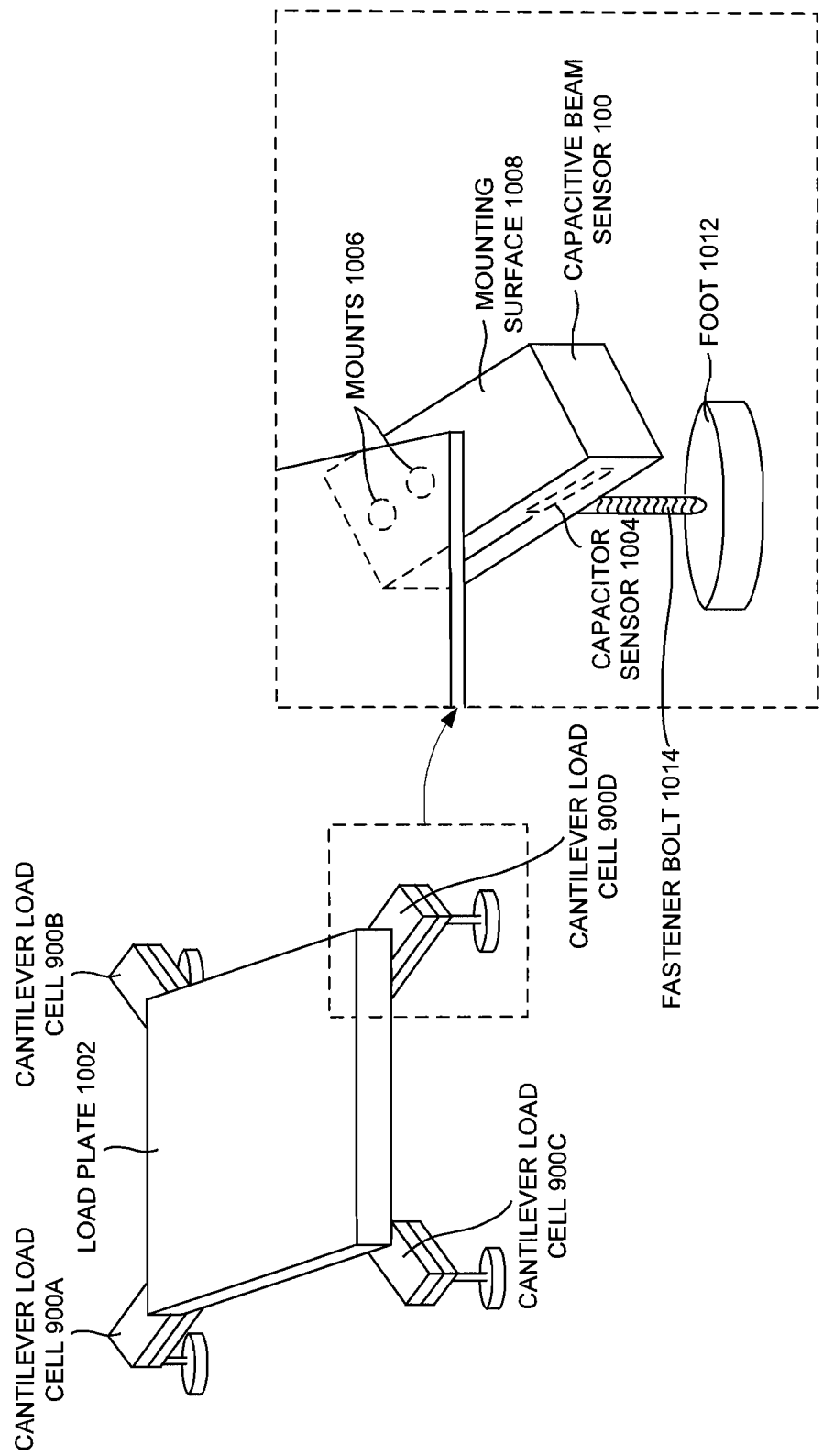
FIG. 10 illustrates an application of the capacitive beam sensor 100, according to one embodiment.

FIG. 10 illustrates an application of the capacitive beam sensor 100, including multiple (e.g., two, three, four etc.) cantilever load cells 900A-D, a load plate 1002, a capacitor sensor 1004, mounts 1006, a mounting surface 1008, a capacitive beam sensor 1010, a foot 1012, and a fastener bolt 1014, according to one embodiment.

In this example embodiment, the capacitive beam sensor 100 is inverted and a load plate 1002 is placed on top of the mounting surfaces 1008.

In one embodiment, multiple cantilever load cells 900A-D are placed inverted below the corners of the load plate 1002. The load plate 1002 may vary in its specifications (e.g., size, shape, thickness, material, etc.). The mounts 1006 may be used to connect the load plate 1002 to the mounting surface 1008 of each cantilever load cell 1000. The foot 1012 may also vary in its specifications and may be attached to the capacitive beam sensor 1014. The capacitor sensor 1004 may be formed according to FIG. 3.

The load (e.g., an object resting on load plate 1002) applied may cause a force 912 (weight or load) downward on the cantilever load cell 900. The resulting normal force upward may cause the displacement in the tilt correction assembly 120, which may cause the change in capacitance in the capacitor sensor 1004.

Figure 11:
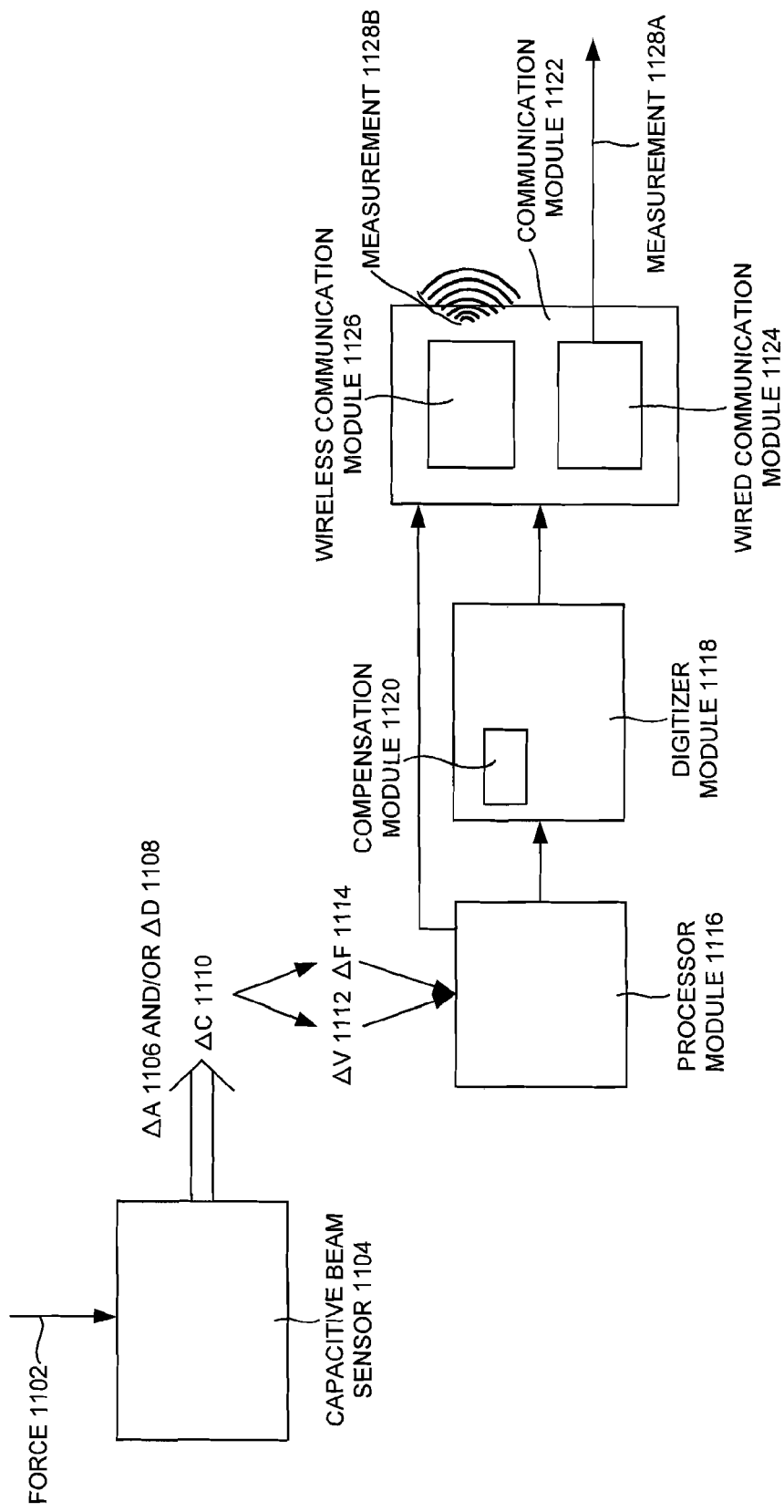
FIG. 11 is a process view of generating a measurement based on a force applied to the capacitive beam sensor 100 of FIG. 1 and/or communicating a measurement, according to one embodiment.

FIG. 11 is a process view of generating a measurement 1128 based on a force 1102 applied to the capacitive beam sensor 100 of FIG. 1 and/or communicating the measurement 1128A-B, according to one embodiment. In FIG. 4A, a force 1102 may be applied to a capacitive beam sensor 100 when the spacer 400 of FIG. 4A is deflected by the force 426, according to one embodiment. An electronic circuitry (e.g., a software and/or hardware code) may apply an algorithm to measure a change in distance 1108 between two plates (e.g., the upper sensor surface 416 and the lower sensor surface 418) of the sensor capacitor and/or the change in overlap area 1106 between another two plates (e.g., the inner conductive area 456 and the outer conductive area 458) when the force 1102 is applied to the capacitive beam sensor 100.

Next, the change in capacitance 1110 may be calculated based on the change in distance 1108 between the two plates or the change in the overlap area 1106 between the two plates forming the sensor capacitor. The change in capacitance 1110, a change in a voltage 1112, and/or a change in a frequency 1114 may also be calculated to generate the measurement (e.g., an estimation of the force 1102 applied to the capacitive beam sensor 1104). The data which encompasses the change in capacitance 1110, the change in voltage 1112, and/or the change in frequency 1114 may be provided to a processor module 1116 which may directly communicate to a communication module 1122 (e.g., for analog data) and/or to a digitizer module 1118 (e.g., for digital data). The digitizer module 1118 may work with the processor module 1116 (e.g., a microprocessor which may be integrated in a signaling circuit of the middle plate PCB 408 and/or the bottom plate PCB 410 of FIG. 4A) to convert the change in capacitance 1110, the change in voltage 1112, and/or the change in frequency 1114 to a measurement 1128.

The digitizer module 1118 may also include a compensation module 1120. The compensation module 1120 may apply a measurement (e.g., digital) of one or more distortion factors to another measurement (e.g., digital) to minimize an effect of the one or more distortion factors to the capacitive beam sensor 100 of FIG. 1.

The communication module 1122 includes a wired communication module 1124 and a wireless communication module 1126. The wired communication module 1124 may communicate a universal serial bus (USB) signal, a voltage signal, a frequency signal, and/or a current signal in an analog and/or a digital form to an external device. The wireless communication module 1126 may communicate information (e.g., the measurement 1128B of FIG. 11) with the external device based on one or more of wireless universal serial bus (USB), a wireless local area network, (e.g., a Wi-Fi), a wireless personal area network (e.g., a Bluetooth), and/or the wireless sensor network (e.g., a Zigbee), etc. The circuitry may be a wireless enabled circuitry that enables the sensor to operate through a wireless network (e.g., using the wireless communication module 1124 of FIG. 11) including a Bluetooth network, a WiFi network, and/or a ZigBee network etc.

In one example embodiment, the processor module 1116 having a central procession unit (CPU) may execute a set of instructions associated with the digitizer module 1118, the compensation module 1120, and/or the communication module 1122. In another example embodiment, a capacitance-to-frequency converter module may generate frequency data based on capacitance data of the capacitive beam sensor 1104. The frequency data may be processed using a timer module coupled to the digitizer module 1118. An effect of an input capacitance intrinsic to an operational amplifier coupled to the timer module may be minimized by driving a power supply of the operational amplifier such that a potential (e.g., a voltage) of the input capacitance is substantially equivalent to a potential of a driving plate (e.g., the lower sensor surface 418 of FIG. 4A) of the capacitive beam sensor 1104. A processing and/or communication zone of the first conductive surface and the second conductive surface having circuitry to enable communication with an external system (e.g., as illustrated in FIG. 11). A circuitry associated with the force measuring assembly may enable a measurement of the capacitive sensor to be communicated through a wireless and/or a wired network.

Figure 12A:
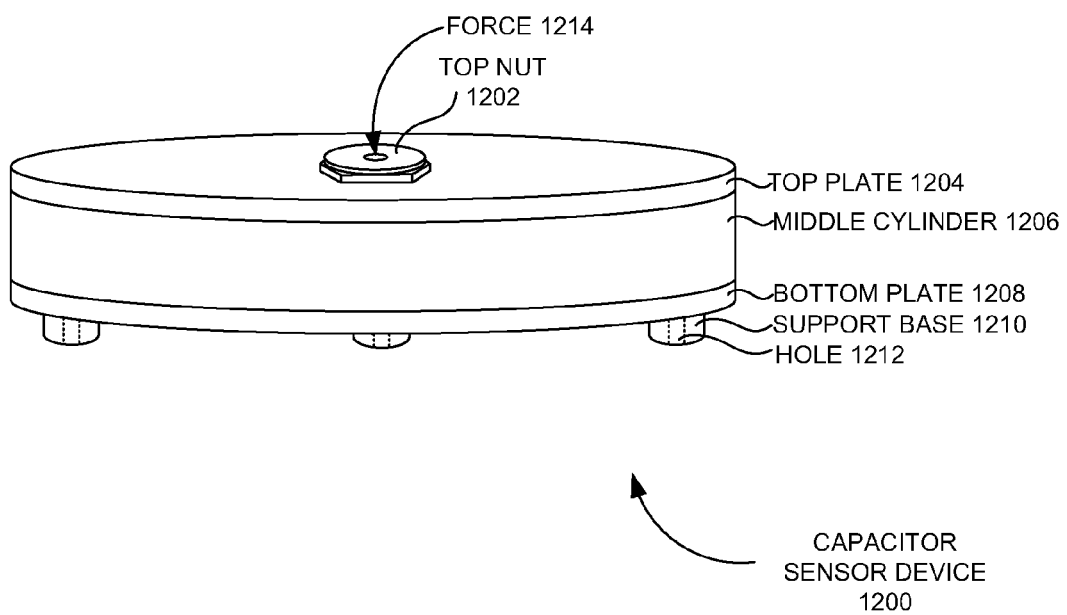
FIG. 12A is a three-dimensional view of a capacitor sensor device 1200 having a sensor capacitor and a reference capacitor, according to one embodiment.

FIG. 12A is a three-dimensional view of a capacitor sensor device 1200 having sensor capacitors (e.g., a sensor capacitor 1388) and a reference capacitor (e.g., a reference capacitor 1390), according to one embodiment.

The capacitive sensor device 1200 (e.g., a cylindrical device) may include a top nut 1202, a cover plate 1204, a middle cylinder 1206, a bottom plate 1208, and a plurality of support bases 1210 (e.g., feet, legs, etc.) each with a hole 1212 (e.g., threaded or unthreaded). As illustrated in FIG. 1, a force (e.g., a force 1214) may be applied on the capacitive sensor device 1200.

Figure 12B:
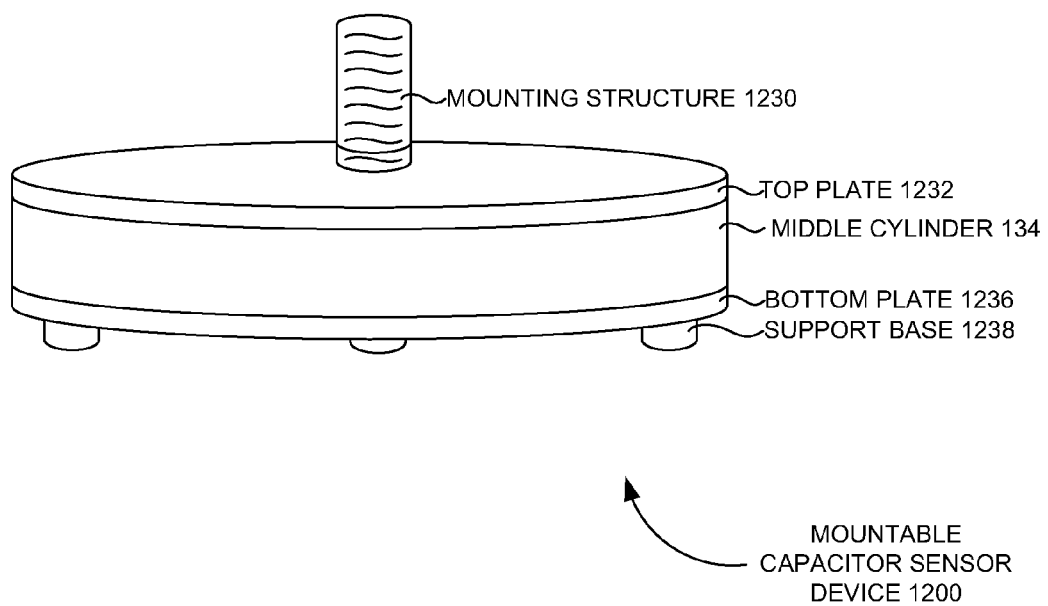
FIG. 12B is a three-dimensional view of a capacitor sensor device 1250 having a mounting structure.

FIG. 12B is a three-dimensional view of a capacitor sensor device 1250 having a mounting structure 1230 (e.g., screw, bolt, etc). The mounting structure 1230 may be used to mount the capacitor sensor device 1250 below a mountable object 1906 (e.g., a table leg, oven, etc.).

In another embodiment, a housing (e.g., which may include the top plate 1204, middle cylinder 1206, bottom plate 1208 and/or a different structure) may be made of a conductive and/or a nonconductive material. In case the nonconductive material is being used, the nonconductive material may be painted (e.g., sputtered, coated, etc.) with the conductive material. The various components of the capacitor sensor device 1200 may be best understood with reference to FIGS. 13A, 13B, 13C, and 13D.

Figure 13A:
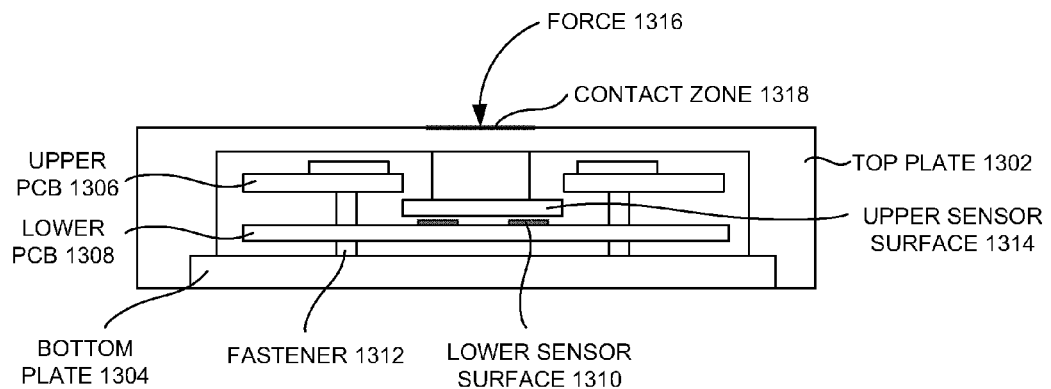
FIGS. 13A, 13B, 13C, and 13D are cross-sectional views of the capacitive force-measuring device. Particularly, FIGS. 13A, 13B, and 13C display three different ways of forming the sensor capacitor and FIG. 13D displays a formation of the reference capacitor, according to one embodiment.
Figure 13B:
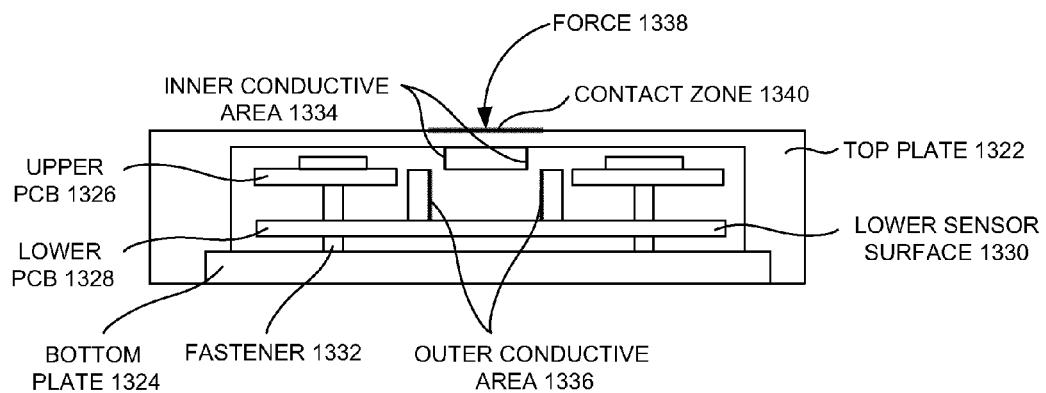
Figure 13C:
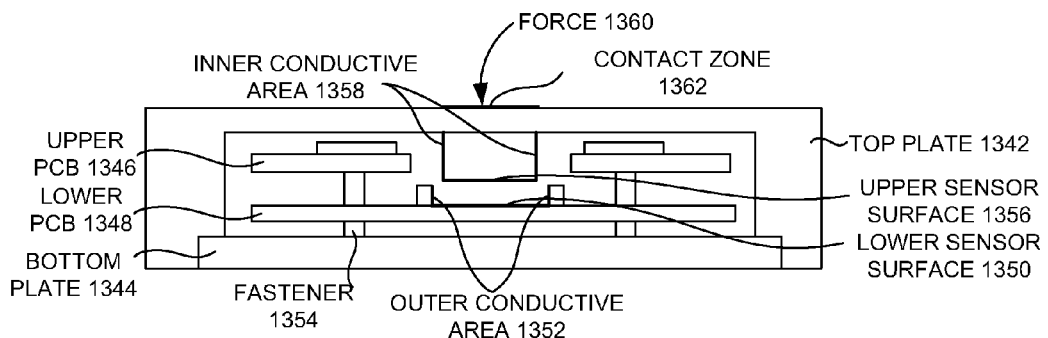
Figure 13D:
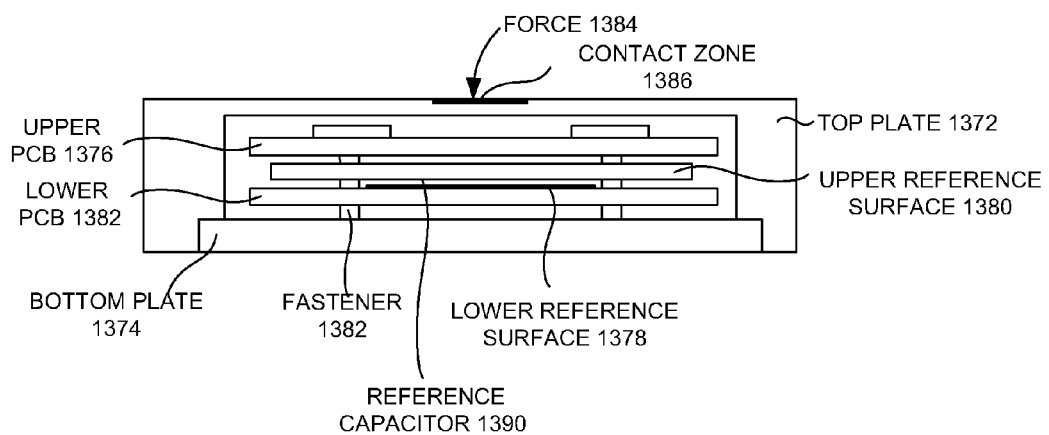

FIGS. 13A, 13B, 13C, and 13D are cross-sectional views of the capacitive force-measuring device, whereas FIGS. 13A, 13B, and 13C display three different ways of forming the sensor capacitor and FIG. 13D displays a formation of the reference capacitor, according to one embodiment.

In FIG. 13A the capacitor sensor device 1200 (e.g., and/or the mountable capacitor sensor device 1250) includes a top plate 1302, a bottom plate 1304, an upper PCB 1306, a lower PCB 1308, a lower sensor surface 1310, a fastener 1312, an upper sensor surface 1314, and a contact zone 1318. A sensor capacitor may be formed between the upper sensor surface 1314 and the lower sensor surface 1310. The upper PCB 1306, the lower PCB 1308 and the bottom plate 1304 may be adjoined together using the fastener 1312.

A deflection of the top plate 1302 (e.g., due to the force 1316) may cause a change in a distance between the upper sensor surface 1314 and the lower sensor surface 1310 of the sensor capacitor. The change in the distance may bring about a change in capacitance of the sensor capacitor. In one example embodiment, the upper sensor surface 1314 and the lower sensor surface 1310 are substantially parallel to each other and have the same physical area and/or thickness. The change in capacitance of the sensor capacitor may be inversely proportional to the change in the distance.

In FIG. 13B, the capacitor sensor device 1200 (e.g., and/or the mountable capacitor sensor device 1250) includes a top plate 1322, a bottom plate 1324, an upper PCB 1326, a lower PCB 1328, an outer conductive area 1330, a fastener 1332, an inner conductive area 1334, and a contact zone 1338. A sensor capacitor may be formed between the inner conductive area 1334 and the outer conductive area 1330. The upper PCB 1326, the lower PCB 1328 and the bottom plate 1324 may be adjoined together using the fastener 1332.

A deflection of the top plate 1322 (e.g., due to the force 1320) may cause a change in an overlap area of the inner conductive area 1334 and the outer conductive area 1330 of the sensor capacitor. The change in the overlap area may bring about a change in capacitance of the sensor capacitor. In one example embodiment, the inner conductive area 1334 and the outer conductive area 1330 may be substantially parallel to each other and have the same physical area and/or thickness. The change in capacitance of the sensor capacitor may be proportional to the change in the overlap area.

In FIG. 13C, the capacitor sensor device 1200 (e.g., and/or the mountable capacitor sensor device 1250) includes a top plate 1342, a bottom plate 1344, an upper PCB 1346, a lower PCB 1348, a lower sensor surface 1350, an outer conductive area 1352, a fastener 1354, an upper sensor surface 1356, an inner conductive area 1358, and a contact zone 1362. A sensor capacitor may be formed between the upper sensor surface 1356 and the lower sensor surface 1350 and/or between the inner conductive area 1358 and the outer conductive area 1352. The upper PCB 1346, the lower PCB 1348 and the bottom plate 1344 may be adjoined together using the fastener 1354.

A deflection of the top plate 1342 (e.g., due to the force 1360) may cause a change in a distance between the upper sensor surface 1356 and the lower sensor surface 1350 and/or a change in an overlap area of the inner conductive surface 1358 and the outer conductive area 1352 of the sensor capacitor. The change in the distance and/or the overlap area may bring about a change in capacitance of the sensor capacitor. In one example embodiment, the upper sensor surface 1356 and the lower sensor surface 1350 (e.g., the inner conductive area 1358 and the outer conductive area 1352) are substantially parallel to each other and have the same physical area and/or thickness. The change in capacitance of the sensor capacitor may be inversely proportional to the change in the distance and/or proportional to the change in the overlap area.

In FIG. 13D, the capacitor sensor device 1200 (e.g., and/or the mountable capacitor sensor device 1250) includes a top plate 1372, a bottom plate 1374, an upper PCB 1326, a lower PCB 1328, a lower reference surface 1380, an upper reference surface 1382, a fastener 1384, and a contact zone 1388. A reference capacitor 1390 may be formed between the upper reference surface 1382 and the lower reference surface 1380. A sensor capacitor may be formed above the upper PCB 1388. The upper PCB 1326, the lower PCB 1328 and the bottom plate 1324 may be adjoined together using the fastener 1384.

The reference capacitor 1390 may experience a change in capacitance only for environmental factors (e.g., humidity, a temperature, an air pressure, a radiation, etc.). Therefore, the environmental factors may be removed from a measurement of a change in capacitance of the sensor capacitor when the force 1390 is applied to the capacitive force-measuring device 1200 (e.g., thereby allowing a user to determine the change in capacitance of the sensor capacitor more accurately).

In one embodiment, a first conductive surface and a second conductive surface may be substantially parallel to the first conductive surface 1358. The spacer 206 to cause the first conductive surface 1358 and/or the second conductive surface 1352 to deflect when a force 1360 is applied to a force measuring assembly (e.g., the force measuring assembly 1406 of FIG. 14) above the sensor. an inner conductive area (e.g., the inner conductive area 1358 of FIG. 13) overlapping with an outer conductive area (e.g., the outer conductive area 1352 of FIG. 13) of the sensor may change an overlap area when the force 1360 is applied to the force measuring assembly 1406, thereby causing a change in capacitance between the inner conductive area 1358 and the outer conductive area 1352. A capacitive sensor below the force measuring assembly 120 may change a capacitance reading when a force is applied to the force measuring assembly 120. A tilt correction assembly 120 of the capacitive sensor may channel a deflection of an upper surface of the sensor such that it does not cause a tilt between conductive plates forming the capacitive sensor.

FIG. 14A illustrates a mattress (e.g., hospital bed, jail cell bed, bed at home, etc.) which may use an upper bolt 1404A and an upper bolt 1404B affixing it to a force measuring assembly 1406 and a lower bolt 1408A and lower bolt 1408B affixing the force measuring assembly 1406 to a mounting rail 1414 through a block 1412 (e.g., made of rigid material) as a junction point between the force measuring assembly 1406 and the mounting rail 1414, which may be mounted on a mounting surface 1416.

FIG. 14B is a force (e.g., weight) measuring assembly 1406 having multiple (two, three, four, etc.) sensor capacitors and reference capacitors, according to one embodiment.

In another example embodiment, the force measuring assembly 1406 may provide a measurement of a localized force based on calculations on the center of gravity. The force measuring assembly may comprise of a plate (e.g., glass, plastic, etc.) that may be placed a top a plurality of capacitor sensor devices 1200. The location of an applied force (e.g., a weight) on the plate may be determined by using the force measurements on each of the capacitor sensor devices 1200.

An applied force 1418 (e.g., weight of a person sitting or laying on the mattress) may exert force on the force measuring assembly 1406. A top nut 1402 may provide a junction point between the upper bolt 1404A to the mattress and an upper surface of the force measuring assembly (e.g., the upper surface of the force measuring assembly 1406 may be similar to the top plate 1204 in FIG. 12A). In another embodiment, the support bases 1410 may be directly fastened to the mounting rail 1414 with fasteners (e.g., screws, bolts, etc.) penetrating threaded or unthreaded inner chambers of the support bases 1410.

In one embodiment, the force measuring assembly 1406 may distribute the force across sensors below the force measuring assembly 1406. The sensors may have the series of nested cantilever beams. The force may cause the series of nested cantilever beams to deflect inward. The series of nested cantilever beams may face each other in alternating form such that each subsequent cantilever beam is inside and oppositely facing a respective outer cantilever beam. The force measuring assembly 1406 may form a platform that is affixed to a mattress of a resting platform. The force measuring assembly 1406 may form a base of a heating oven that determines a quantity of heat required based on a weight of an object placed on the force measuring assembly 1406. The force may be distributed across sensors below the force measuring assembly 120. The sensors may have the series of nested cantilever beams. The series of nested cantilever beams may face each other in alternating form such that each subsequent cantilever beam is inside and oppositely facing a respective outer cantilever beam.

Figure 15:
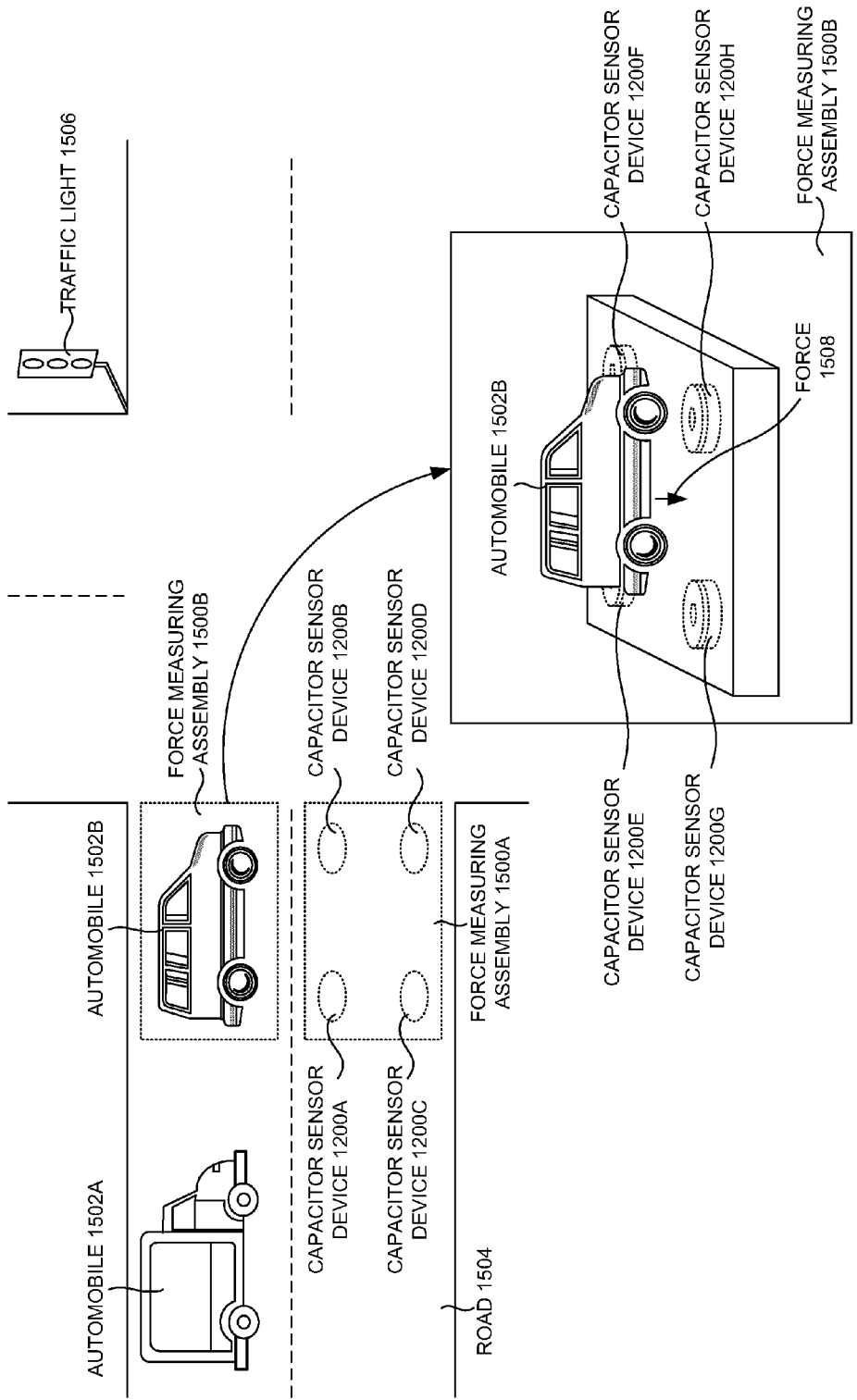
FIG. 15 is a force measuring assembly 1500 having multiple sensor capacitors and reference capacitors, detecting the presence of automobiles on a road, according to one embodiment.

FIG. 15 is a force (e.g., weight) measuring assembly 1500 having multiple (two, three, four, etc.) sensor capacitors and reference capacitors, detecting the presence of an automobile 1502A and 1502B (e.g., a car, truck, motorcycle, etc.) on a road 1504, according to one embodiment. The automobile 1502B applies a force (e.g., a weight) on the force measuring assembly 1500B which may, control a traffic light 1506 according to one embodiment.

Figure 16:
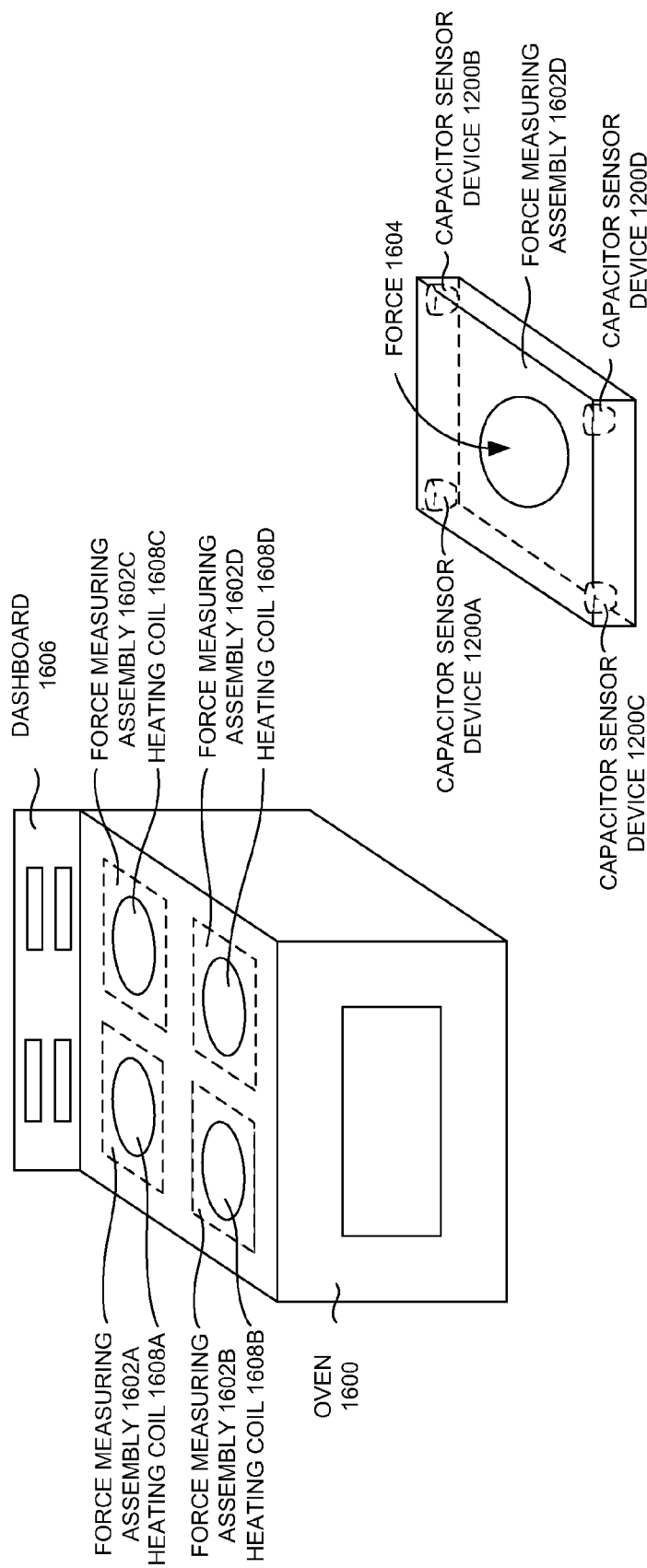
FIG. 16 is an oven 1600, having multiple force measuring assemblies, multiple heating coils and a dashboard, according to one embodiment.

FIG. 16 is an oven 1600, having multiple (two, three, four etc.) force measuring assemblies 1602, multiple heating coils 1608 (two, three, four, etc.) and a dashboard 1606, according to one embodiment. The force measuring assembly 1602 having multiple (two, three, four, etc.) capacitor sensor devices 1200, may measure an applied force 1604 (e.g., weight) applied on a heating coil 1608 and display a measurement on the dashboard 1606, according to one embodiment.

The dashboard 1606 may provide change of force (e.g., weight) measurements applied to each force measuring assembly. In one application, this may be used to determine the amount of an ingredient (e.g., salt, sugar, chicken stock, etc.) added to a cooking contained (e.g., a pan, pot, etc.) while cooking.

Figure 17:
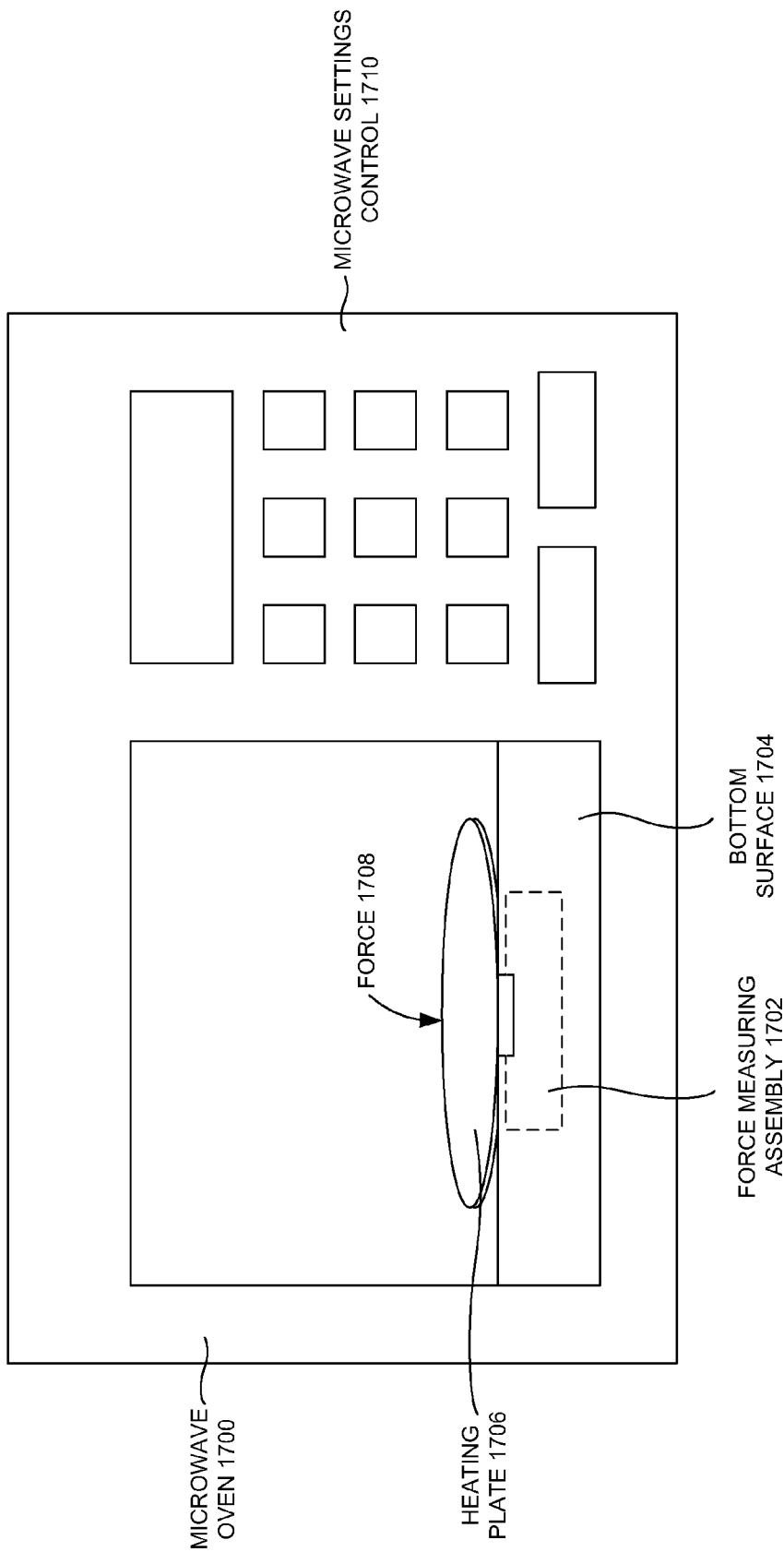
FIG. 17 is a microwave oven 1700, having a force measuring assembly with multiple capacitor sensor devices, a heating plate, bottom surface, and microwave settings control, according to one embodiment.

FIG. 17 is a microwave oven 1700, having a force measuring assembly 1702 with multiple (two, three, four, etc.) capacitor sensor devices (e.g., force measuring assembly 1602 D in FIG. 15), a heating plate 1706, bottom surface 1704, and microwave settings control 1710, according to one embodiment.

A force 1708 (e.g., weight) may be applied on the heating plate 1706 from any object needing to be warmed (e.g., food, heating pad, cup of water, etc.). The force measuring assembly 1702 may be contained in the bottom surface 1704 according to one embodiment. The microwave settings control 1710 (start button, time, heat level, etc.) may be used to control the application of the microwave oven 1700. The force measuring assembly 1702 may be used to determine the weight of the object being heated (e.g., chicken, pork, fish). In one embodiment, this measurement may be configured based on selections in the microwave settings control 1710 to determine the correct heating time, depending on the weight of the object on the heating plate 1706.

Figure 18:
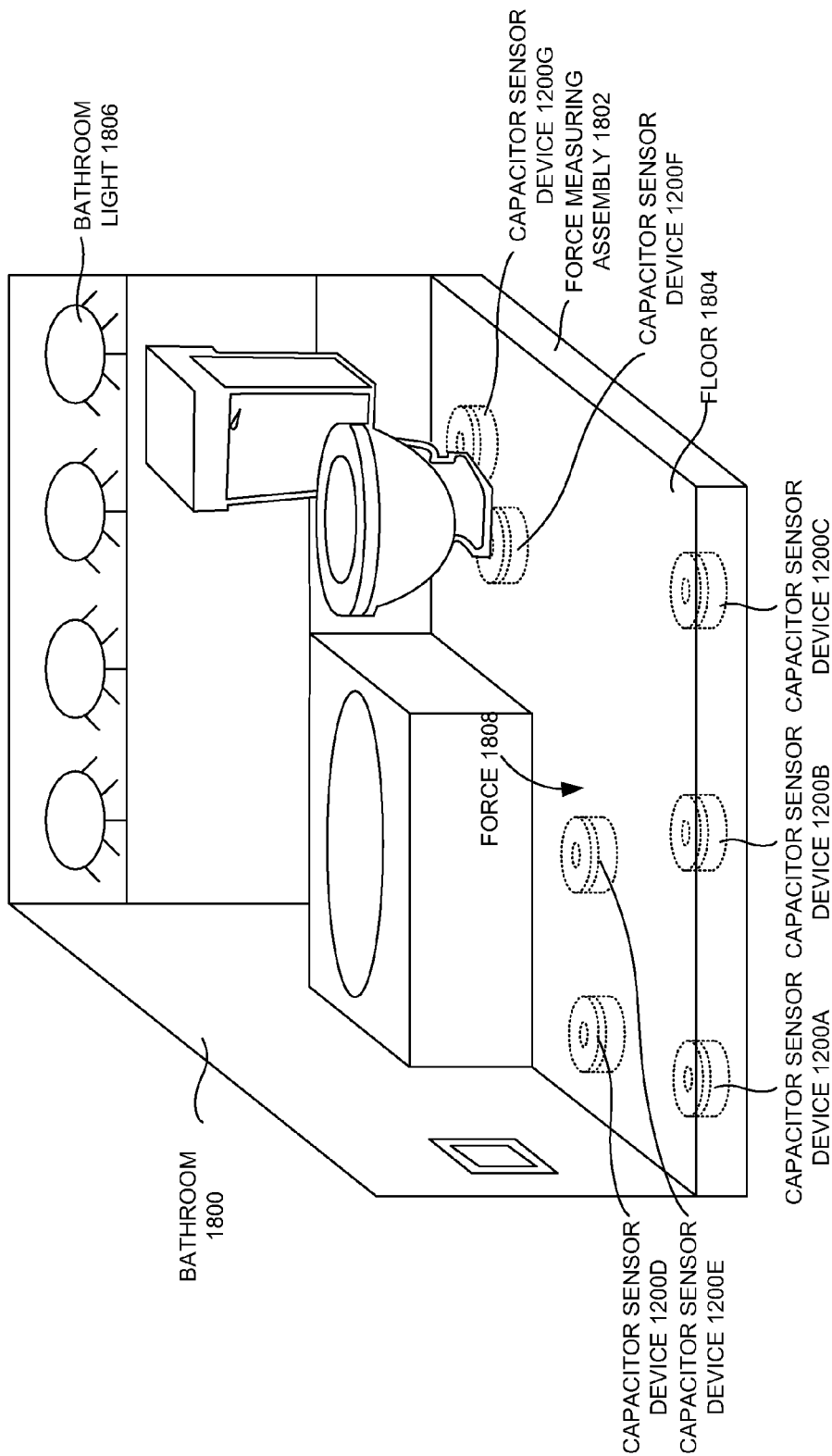
FIG. 18 is a three-dimensional view of a bathroom having a force measuring assembly, below the bathroom floor, containing multiple capacitor sensor devices 1200 to control the bathroom light, according to one embodiment.

FIG. 18 is a three-dimensional view of a bathroom 1800 having a force measuring assembly 1802, below the bathroom floor 1804, containing multiple (two, three, four, etc.) capacitor sensor devices 1200 to control the bathroom light 1806, according to one embodiment. A force 1808 (weight of a person standing in the bathroom) applied to the force measuring assembly 1802 may control the turning on/off of the bathroom light 1806. The force measuring assembly 1406 may form a platform of a floor (e.g., the floor 1804 of FIG. 18) that determines whether lighting is required based on a weight of an object placed on the platform. The force measuring assembly 1406 may be a part of a patient monitoring system that transmits an alert to a hospital staff member across wireless and/or wired devices when there is a change in the force reading beyond a threshold value.

Figure 19:
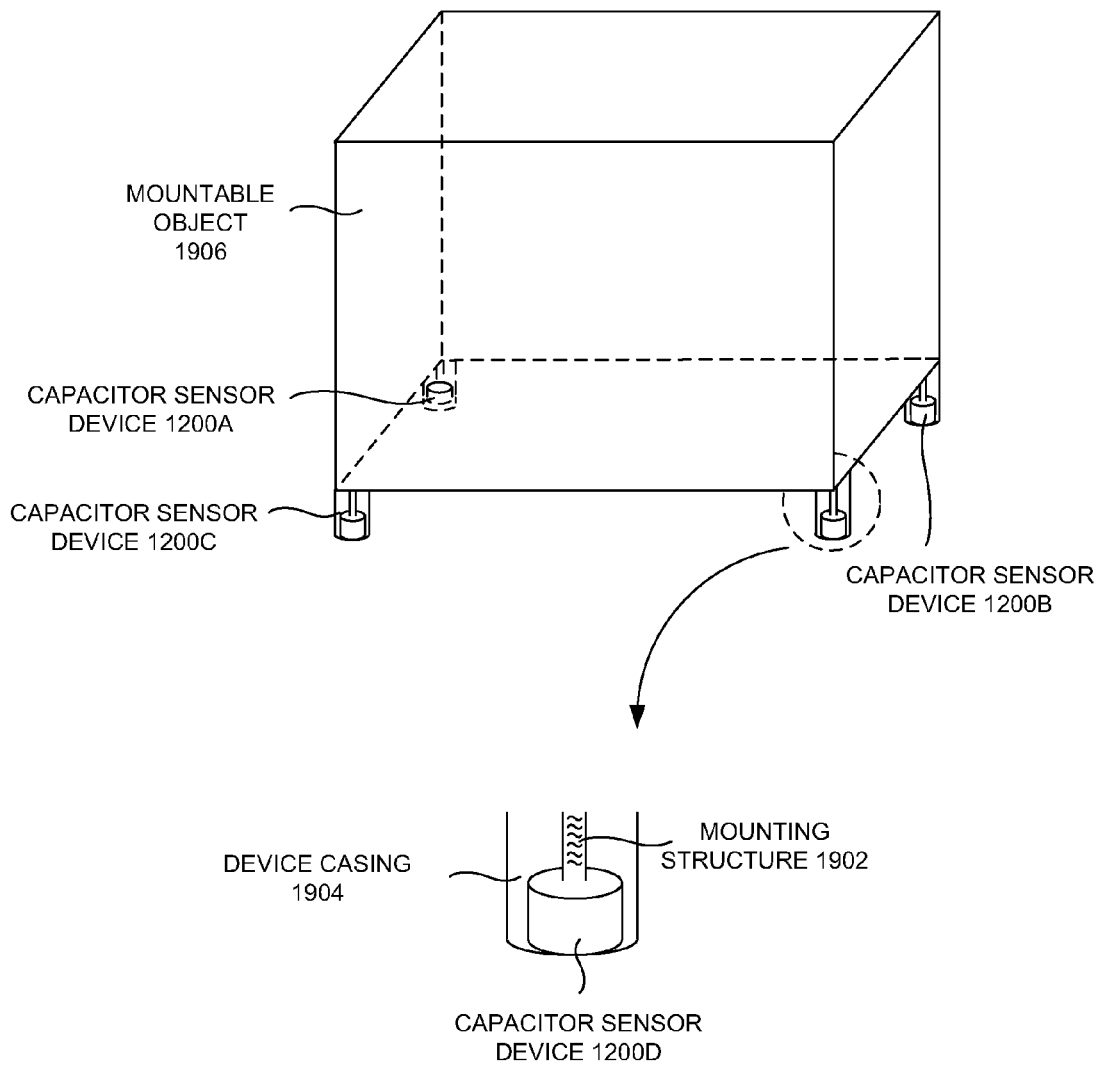
FIG. 19 is a three-dimensional view of a mountable object mounted to multiple mountable capacitor sensor devices 1250, according to one embodiment.

FIG. 19 is a three-dimensional view of a mountable object 1906 (table, oven, platform, etc.) mounted to multiple (two, three, four, etc.) mountable capacitor sensor devices 1250, according to one embodiment. The mountable capacitor sensor device 1250 may be enclosed by a device casing (plastic, metal, etc.) and attached to the mountable object by use of its mountable structure 1902.

The mountable capacitor sensor device 1250 may be used as a foot for the mountable object 1906 (e.g., sofa, chair, refrigerator, etc.). The mountable capacitor sensor device 1250 may provide measurements (e.g., loads, forces, etc.) regarding any mountable object 1906 which may be mounted on a plurality of the capacitor sensor devices 1250.

In another example embodiment, the capacitor sensor device 1200 may be placed above a castor wheel for an object requiring movement (e.g., a chair, a cart, a hospital bed, etc.). A castor wheel may be a small wheel on a swivel, set under a piece of an object (e.g., furniture, machine, etc.) which may facilitate movement.

Figure 20:
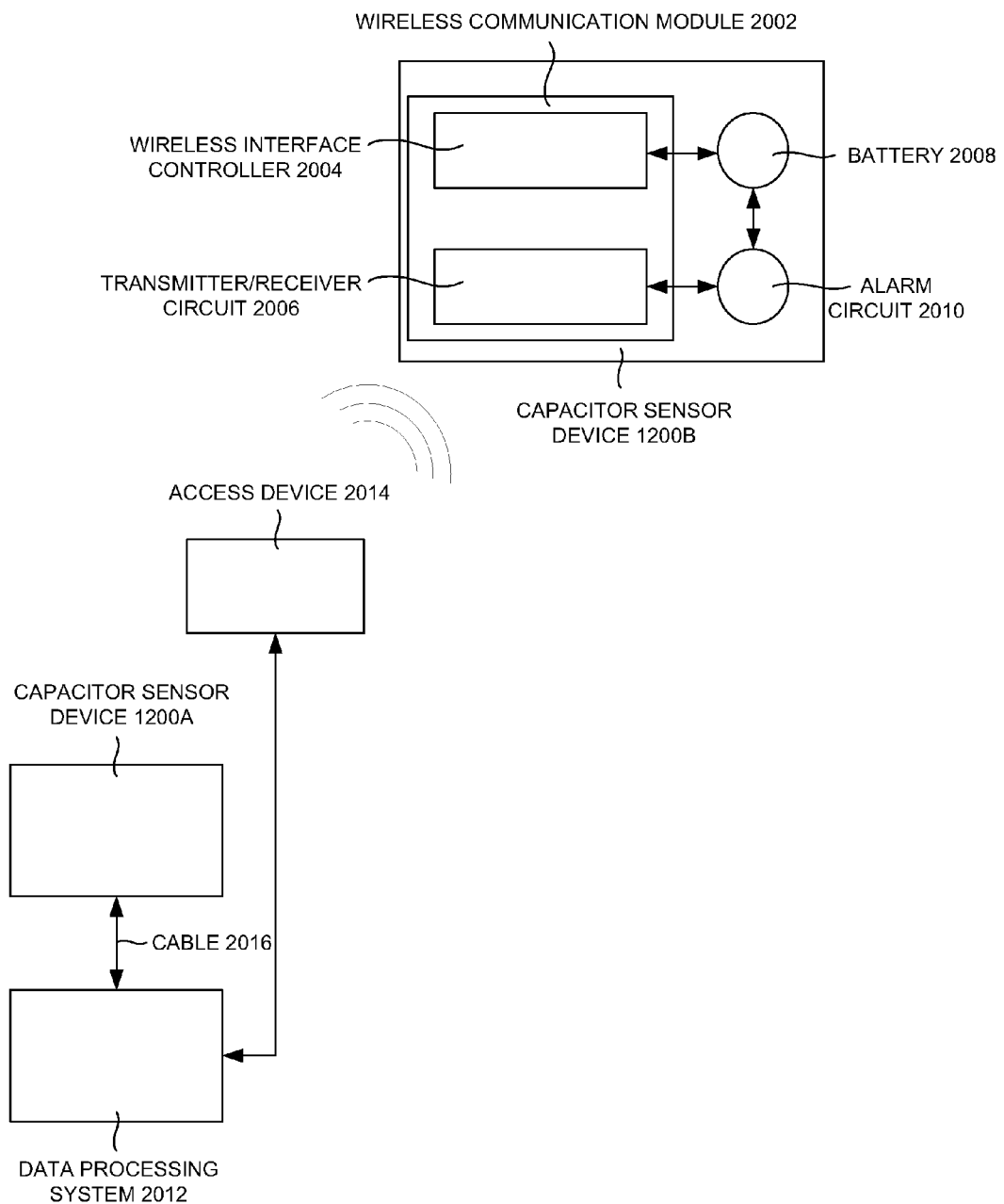
FIG. 20 is a network enabled view of the capacitor sensor device 1200 of FIG. 12A, according to one embodiment.

FIG. 20 is a network enabled view of the capacitor sensor device 1200 of FIG. 12A, according to one embodiment. The capacitor sensor device 1200A may be connected to a data processing system 2012 (e.g., an external device) through a cable 2016 as illustrated in FIG. 11. A capacitive sensor device 1200B is wirelessly connected to the data processing system 2012 through an access device 2014 (e.g., a device which enables wireless communication between devices forming a wireless network). The capacitor sensor device 1000B includes a wireless communication module 2002 (e.g., the wireless communication module 1126 of FIG. 11) having a transmitter/receiver circuit 2006 and a wireless interface controller 2004 (e.g., for wireless communication), a battery 2008 (e.g., to sustain as a standalone device), and an alarm circuit 2010 (e.g., to alert a user when the force to the capacitor sensor device 1200 is greater than a threshold value and/or when the battery is almost out).

The data processing system 2012 may receive data (e.g., output data measuring a force and/or a load, data measured by the capacitor sensor device 1200 of FIG. 12A, etc.) from the capacitor sensor device 1200A and/or the capacitive sensor device 2000B. In one embodiment, the data processing system 2012 may analyzes data (e.g., the measurement 1128A and the measurement 1128B) generated by various operation of the capacitive force-measuring device 1200. In another example embodiment, a universal serial bus (USB) may be included in a signaling layer of the capacitor sensor device 1200 and/or the mountable capacitor sensor device 1250 of FIG. 12B. The USB (e.g., a USB port or hub with mini sockets) may allow a hardware interface for the data processing system 2012 (e.g., which may be an external device) and/or a hardware interface for attaching a peripheral device (e.g., a storage device such as a flash drive, etc.).

Figure 21:
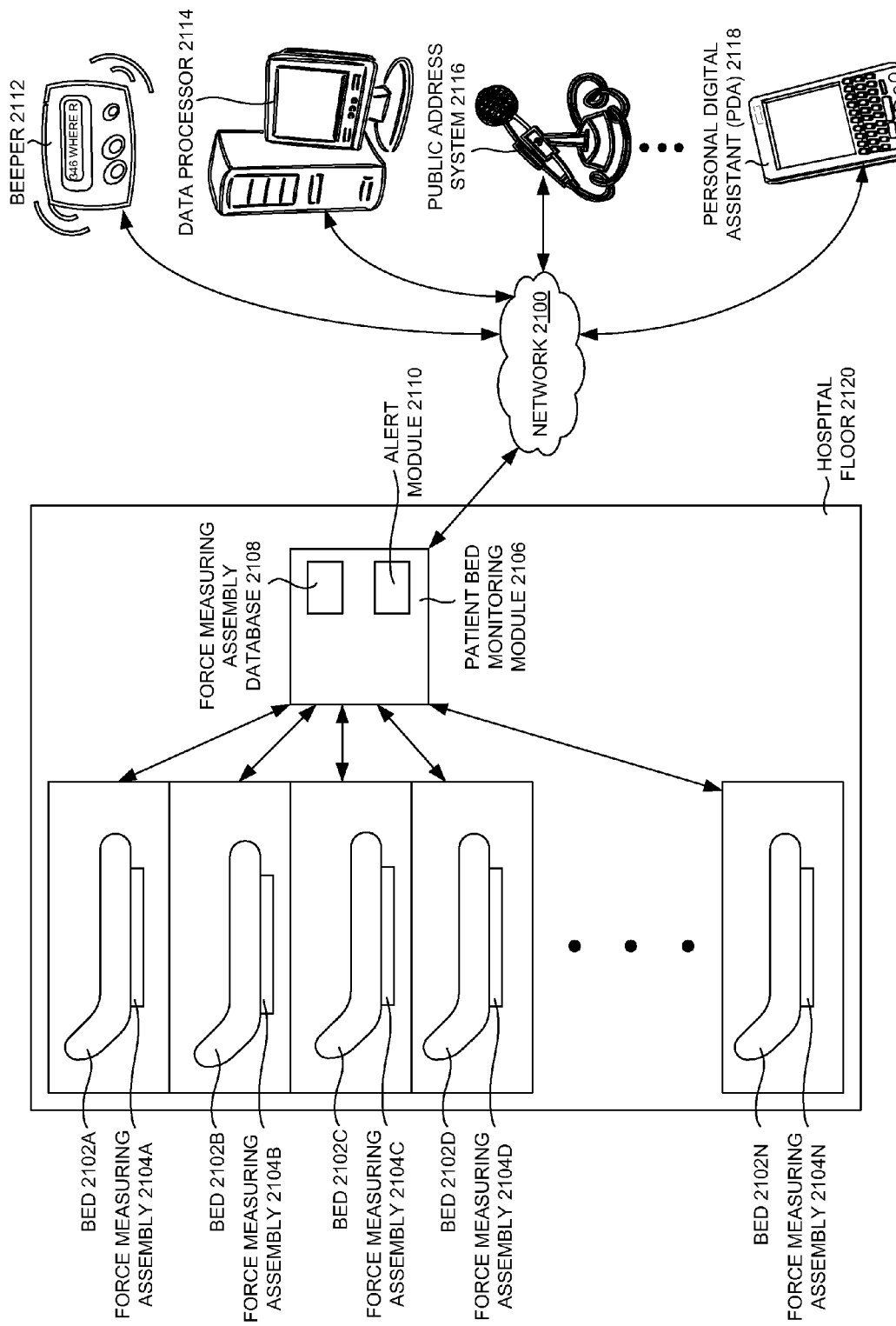
FIG. 21 is a conceptual diagram of a patient monitoring network, according to one embodiment.

FIG. 21 is a conceptual diagram of a patient monitoring network, according to one embodiment. Particularly, FIG. 21 illustrates a network 2100, patient bed 2102 attached to a force measuring assembly 2104, patient monitoring module 2106, force assembly measuring database 2108, alert module 2110, a beeper 2112, data processor 2114, public address system 2116, a personal digital assistant (PDA) 2118, and a hospital floor 2120.

The patient monitoring module 2106 may be placed on a hospital floor 2120 with patient beds (Bed 2102A, 2102B, etc.). The force measuring assembly 2104 may send a force measurement 1928A (e.g., weight of patient) to the force measuring assembly database 2108 through a communication module 1122 (e.g., as seen in FIG. 11). The patient monitoring module 2106 may use the alert module 2110 to send alert signals through the network 2100 to various devices (beeper, data processor, public address system, PDA, etc.).

The alert module 2110 may send a signal through the network 2100 to contact needed parties through various devices. A beeper 2112 or personal digital assistant belonging to an interested party (e.g., doctor, nurse, family member of patient, etc.) may be alerted. A data processor 2114 may receive data from the patient monitoring module 2106 for records. A public address system 2116 may be contacted to make an announcement.

Figure 22:
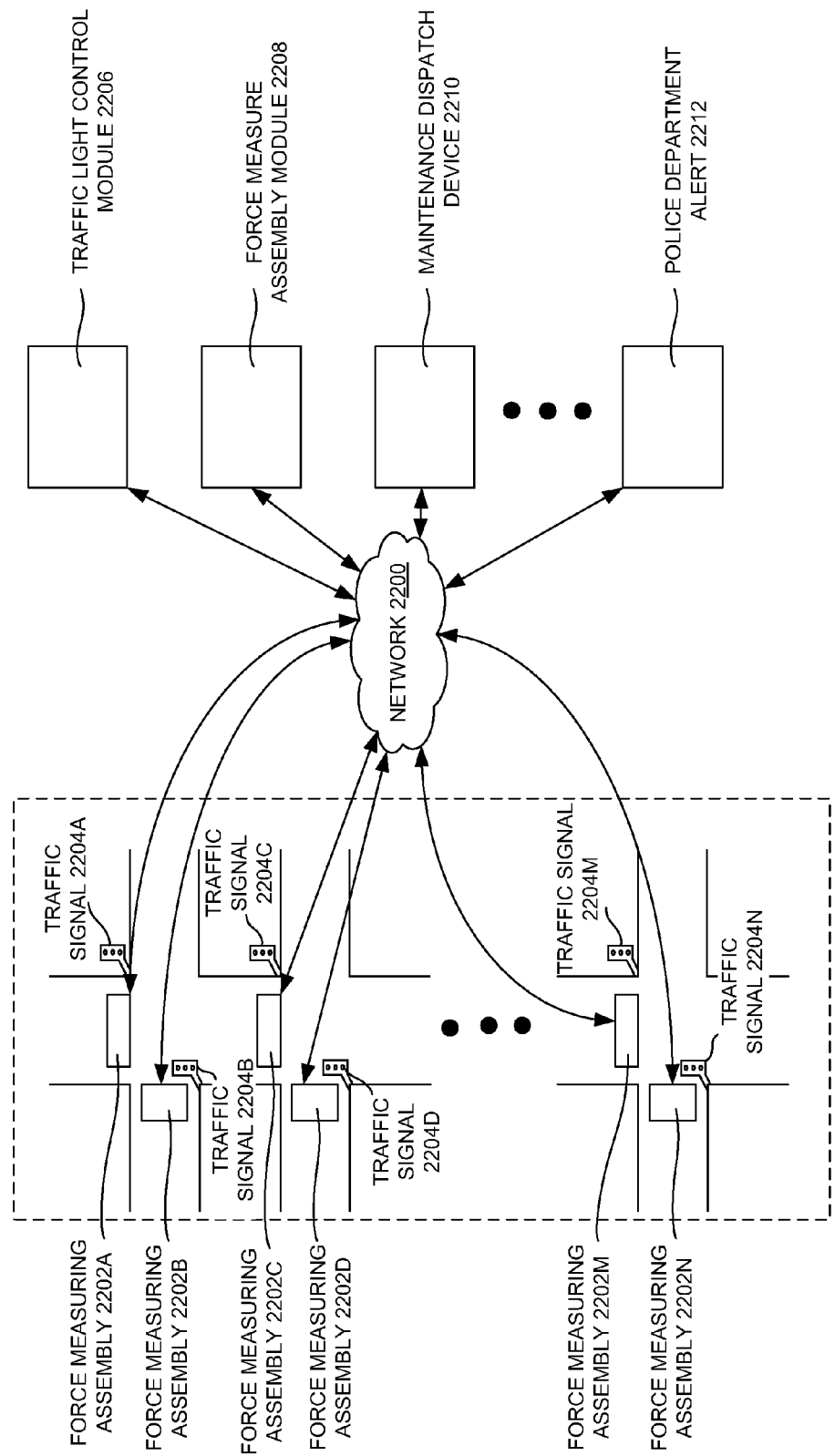
FIG. 22 is a conceptual diagram of a network 2200 controlling traffic, according to one embodiment.

FIG. 22 is a conceptual diagram of a network 2200 controlling traffic. Particularly, FIG. 22A depicts multiple (two, three, four, etc.) force measuring assemblies 2202 and traffic signals 2204, a traffic light control module 2206, a force measuring assembly module 2208, a maintenance dispatch device 2210, and a police department alert 2212, according to one embodiment.

The force measuring assembly 2202 may transmit a signal to the network through the mechanism illustrated in FIG. 9, indicating the presence of an automobile 402A (car, truck, etc. shown in FIG. 4). The traffic light control module 2206 may control the traffic signal 2204 depending on the presence of automobiles 2202 at particular force measuring assemblies 2202.

The force measure assembly module 2208 may process measurements transmitted from force measuring assembly 2202 for records or to alert other modules in the network 2200. The maintenance dispatch device 2210 may alert a maintenance team to fix a traffic signal or other road related problems identified by the various modules. The police department alert 2212 may also receive signals when needed for response. The force measuring assembly 1406 may be part of a traffic control system that measures a presence of an automobile at a particular location and transmits a wireless alert to a maintenance center based on abnormal force readings witnessed through the force measuring assembly (e.g., as illustrated in FIG. 22).

Figure 23:
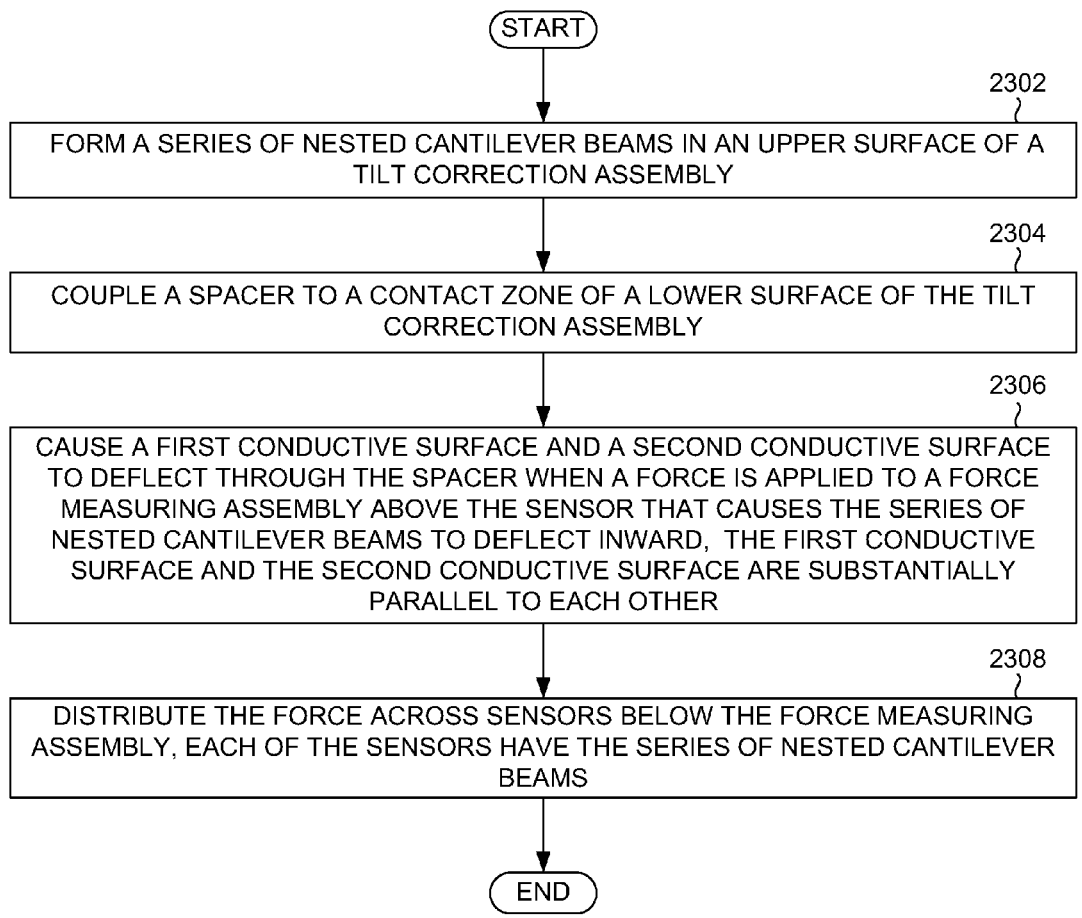
FIG. 23 is a process flow of creating a series of nested cantilever beams in an upper surface of a tilt correction assembly 120, according to one embodiment.

FIG. 23 is a process flow of creating a series of nested cantilever beams in an upper surface of a tilt correction assembly 120, according to one embodiment.

In operation 2302, a series of nested cantilever beams in an upper surface of a tilt correction assembly. In operation 2304, a spacer may be coupled to a contact zone of a lower surface of the tilt correction assembly 120. In operation 2306, a first conductive surface and a second conductive surface may be caused to deflect through the spacer when a force is applied to a force measuring assembly above the sensor that causes the series of nested cantilever beams to deflect inward. The first conductive surface and the second conductive surface may be substantially parallel to each other. In operation 2308, the force may be distributed across sensors below the force measuring assembly. Each of the sensors may have the series of nested cantilever beams. The series of nested cantilever beams may face each other in alternating form (e.g., such that each subsequent cantilever beam is inside and oppositely facing a respective outer cantilever beam).

Although the present embodiments have been described with reference to specific example embodiments, it will be evident that various modifications and changes may be made to these embodiments without departing from the broader spirit and scope of the various embodiments. For example, digitizer module 912 and/or the processing module 914 of FIG. 9, and/or the transmitter/receiver circuit 1008, the wireless interface controller 1010 and the alarm circuit 1014 of FIG. 10, patient bed monitoring module 1106 and alert module 1110 of FIG. 11, traffic light control module 2206 and force measuring assembly module 2208 of FIG. 22, described herein may be enabled and operated using hardware circuitry (e.g., CMOS based logic circuitry), firmware, software and/or any combination of hardware, firmware, and/or software (e.g., embodied in a machine readable medium).

For example, digitizer module 912 and/or the processing module 914 of FIG. 9, and/or the transmitter/receiver circuit 1008, the wireless interface controller 1010 and the alarm circuit 1014 of FIG. 10, patient bed monitoring module 1106 and alert module 1110 of FIG. 11, traffic light control module 2206 and force measuring assembly module 2208 of FIG. 22, may be enabled using software and/or using transistors, logic gates, and electrical circuits (e.g., application specific integrated ASIC circuitry) such as a local inventory circuit, a supplier inventory circuit, a manufacturer inventory circuit, a container circuit, a capacitive sensor circuit, a digitizer circuit, a processing circuit, a transmitter/receiver circuit, a wireless interface circuit and/or an alarm circuit.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., Application Specific Integrated Circuitry (ASIC) and/or in Digital Signal Processor (DSP) circuitry).

For example, the processor module 1116, the digitizer module 1118, the compensation module 1120, the communication module 1122, the wired communication module 1124 and/or the wireless communication module 1126 of FIG. 11 may be enabled using software and/or using transistors, logic gates, and electrical circuits (e.g., an application specific integrated (ASIC) circuitry) such as a processor circuit, a digitizer circuit, a compensation circuit, a communication circuit, a wired communication circuit, a wireless communication circuit and/or other circuits using one or more of the technologies described herein.

In addition, it will be appreciated that the various operations, processes, and methods disclosed herein may be embodied in a machine-readable medium and/or a machine accessible medium compatible with a data processing system (e.g., a computer system), and may be performed in any order.

The modules in the figures are shown as distinct and communicating with only a few specific module and not others. The modules may be merged with each other, may perform overlapping functions, and may communicate with other modules not shown to be connected in the Figures. Accordingly, the specification and drawings are to be regarded in an illustrative rather than a restrictive sense.

What is claimed is:
1. A sensor, comprising:
  a series of nested cantilever beams in an upper surface of a tilt correction assembly;
  a spacer coupled to a contact zone of a lower surface of the tilt correction assembly;

a first conductive surface and a second conductive surface substantially parallel to the first conductive surface, wherein the spacer to cause at least one of the first conductive surface and the second conductive surface to deflect when a force is applied to a force measuring assembly above the sensor; and an inner conductive area overlapping with an outer conductive area of the sensor to change an overlap area or the gap between the areas when the force is applied to the force measuring assembly, thereby causing a change in a capacitance between the inner conductive area and the outer conductive area.

2. The sensor of claim 1, wherein the force measuring assembly to distribute the force across a plurality of sensors below the force measuring assembly, wherein each of the plurality of sensors have the series of nested cantilever beams, and wherein the force causes the series of nested cantilever beams to deflect inward.

3. The sensor of claim 2 wherein the series of nested cantilever beams face each other in alternating form such that each subsequent cantilever beam is inside and oppositely facing a respective outer cantilever beam.

4. The sensor of claim 3 wherein the upper surface of the tilt correction assembly to include threaded mounting holes at a center of an innermost inner cantilever beam of the series of nested cantilever beams, such that the threaded mounting holes permit the sensor to be mounted to a mountable object through a mounting structure.

5. The sensor of claim 4 wherein the mounting structure and the sensor is encompassed by a device casing, and wherein the nested cantilever beams are circular in form.

6. The sensor of claim 1 further comprising a printed circuit board having a heightened surface along its borders creating a space that enables the series of nested cantilever beams to displace when the force is applied to the force measuring assembly.

7. A method, comprising:
creating a series of nested cantilever beams in an upper surface of a tilt correction assembly;
coupling a spacer to a contact zone of a lower surface of the tilt correction assembly;
causing at least one of a first conductive surface and a second conductive surface to deflect through the spacer when a force is applied to a force measuring assembly above the sensor that causes the series of nested cantilever beams to deflect inward, wherein the first conductive surface and the second conductive surface are substantially parallel to each other; and
overlapping an inner conductive area with an outer conductive area of the sensor to change an overlap area or the gap between the areas when the force is applied to the force measuring assembly, thereby causing a change in a capacitance between the inner conductive area and the outer conductive area.

8. The method of claim 7 further comprising distributing the force across a plurality of sensors below the force measuring assembly, wherein each of the plurality of sensors have the series of nested cantilever beams.

9. The method of claim 8 wherein the series of nested cantilever beams face each other in alternating form such that each subsequent cantilever beam is inside and oppositely facing a respective outer cantilever beam.

10. A force measuring assembly, comprising:
a capacitive sensor below the force measuring assembly to change a capacitance reading when a force is applied to the force measuring assembly;
a tilt correction assembly of the capacitive sensor to channel a deflection of an upper surface of the sensor such that it does not cause a tilt between conductive plates forming the capacitive sensor; and
an inner conductive area overlapping with an outer conductive area of the sensor to change an overlap area or the gap between the overlap areas when the force is applied to the force measuring assembly, thereby causing a change in capacitance between the inner conductive area and the outer conductive area.

11. The force measuring assembly of claim 10 further comprising: a circuitry
associated with the force measuring assembly to enable a measurement of the capacitive sensor to be communicated through at least one of a wireless and a wired network.

12. The force measuring assembly of claim 10 wherein the force measuring assembly forms a platform that is affixed to a mattress of a resting platform.

13. The force measuring assembly of claim 10 wherein the force measuring assembly forms a base of a heating oven that determines a quantity of heat required based on a weight of an object placed on the force measuring assembly.

14. The force measuring assembly of claim 10 wherein the force measuring assembly forms a platform of a floor that detects the presence of an object or person and determines whether lighting or some other equipment is to be turned on or off based on a weight of an object placed on the platform.

15. The force measuring assembly of claim 10 wherein the force measuring assembly is part of a patient monitoring system that transmits an alert to a hospital staff member across a plurality of wireless and wired devices when there is a change in the force reading beyond a threshold value.

16. The force measuring assembly of claim 10 wherein the force measuring assembly is part of a traffic control system that measures a presence of an automobile at a particular location and transmits a wireless alert to a maintenance center based on abnormal force readings witnessed through the force measuring assembly.

17. The force measuring assembly of claim 10 further comprising:
a processing and communication zone of the capacitive sensor having circuitry to enable communication with an external system.

18. The force measuring assembly of claim 17 wherein the circuitry to enable communication with an external system is through a Universal Serial Bus (USB) interface.

19. The force measuring assembly of claim 18 wherein the circuitry is a wireless enabled circuitry that enables the sensor to operate through a wireless network including at least one of a Bluetooth network, a WiFi network, a WiMax network and a ZigBee network.

* * * * *